US012580350B2

(12) United States Patent
Yin et al.

(10) Patent No.: US 12,580,350 B2

(45) Date of Patent: Mar. 17, 2026

(54) HIGH SPEED, HIGH PERFORMANCE ELECTRICAL CONNECTOR

(71) Applicant: Amphenol Commercial Products (Chengdu) Co., Ltd., Chengdu (CN)

(72) Inventors: Wenfeng Yin, Chengdu (CN); Xiaodong Hu, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 305 days.

(21) Appl. No.: 18/448,239

(22) Filed: Aug. 11, 2023

(65) Prior Publication Data

US 2024/0063580 A1 Feb. 22, 2024

(30) Foreign Application Priority Data

Aug. 16, 2022 (CN) ......................... 202222148904.1

(51) Int. Cl.
*H01R 13/6599* (2011.01)
*H01R 12/72* (2011.01)
(Continued)

(52) U.S. Cl.
CPC ......... *H01R 13/6599* (2013.01); *H01R 12/72* (2013.01); *H01R 13/03* (2013.01); *H01R 13/6471* (2013.01)

(58) Field of Classification Search
CPC .... H01R 12/716; H01R 12/724; H01R 12/73; H01R 13/6599
(Continued)

(56) References Cited

U.S. PATENT DOCUMENTS 7,581,990 B2 9/2009 Kirk et al.
8,167,631 B2 * 5/2012 Ito ........................ H01R 12/721 439/108

(Continued)

FOREIGN PATENT DOCUMENTS

CN 202585857 U 12/2012
CN 203205638 U 9/2013

(Continued)

OTHER PUBLICATIONS

[No Author Listed], Sff Committee SFF-8639 Specification for Multifunction 6X Unshielded Connector. Rev 2.1. Development. SNIA SFF TWG Technology Affiliate. May 26, 2017. 32 pages.

(Continued)

*Primary Examiner* — Marcus E Harcum
(74) *Attorney, Agent, or Firm* — Wolf, Greenfield & Sacks, P.C.

(57) ABSTRACT

A connector for use with high-speed signals. The connector includes conductive elements held in rows and a member between rows of conductive elements. The conductive elements have pairs of signal conductors and ground conductors disposed between the pairs of the signal conductors. The member has a lossy body and a conductive layer plated on the lossy body to electrically connect the ground conductors. The lossy body of the member has openings and/or protrusions disposed and sized such that the conductive layer plated on the lossy body provides shortened conductive paths between ground conductors in different rows. The member can be configured to tune the impedance at desired regions such as the mating region. Such a configuration meets signal integrity requirements in connectors designed for high speed transmission, while conforming to a standard that constrains mating and mounting interfaces.

20 Claims, 11 Drawing Sheets

(51) Int. Cl.
*H01R 13/03* (2006.01)
*H01R 13/6471* (2011.01)

(58) Field of Classification Search
USPC .................................... 439/607.02, 941, 931
See application file for complete search history.

(56) References Cited

U.S. PATENT DOCUMENTS

| | | | | |
|---|---|---|---|---|
| 8,462,502 | B2 | 6/2013 | Hirano et al. | |
| 8,585,440 | B2 | 11/2013 | Jiang et al. | |
| 8,657,627 | B2 | 2/2014 | McNamara et al. | |
| 8,702,451 | B2 | 4/2014 | Luo et al. | |
| 8,740,631 | B2 | 6/2014 | Chen | |
| 8,764,488 | B2 * | 7/2014 | Zeng | H01R 13/6585 439/108 |
| 8,858,243 | B2 | 10/2014 | Luo et al. | |
| 8,944,849 | B1 * | 2/2015 | Yang | H01R 13/6588 439/607.07 |
| 9,077,118 | B2 | 7/2015 | Szu et al. | |
| 9,083,130 | B2 * | 7/2015 | Casher | H01R 12/00 |
| 9,225,090 | B2 | 12/2015 | Chen | |
| 9,337,585 | B1 * | 5/2016 | Yang | H01R 13/6583 |
| 9,407,022 | B1 | 8/2016 | Wang | |
| 9,455,530 | B2 * | 9/2016 | Patel | H01R 13/6597 |
| 9,509,098 | B1 * | 11/2016 | Henry | H01R 13/6471 |
| 9,520,680 | B2 | 12/2016 | Hsu et al. | |
| 9,531,129 | B2 * | 12/2016 | de Boer | H01R 13/6471 |
| 9,564,714 | B1 | 2/2017 | Wang et al. | |
| 9,705,218 | B2 * | 7/2017 | Ito | H01R 13/6471 |
| 9,759,879 | B1 * | 9/2017 | Takai | H05K 1/117 |
| 9,768,557 | B2 * | 9/2017 | Phillips | H01R 13/6585 |
| 9,819,125 | B2 * | 11/2017 | Regnier | H01R 13/6272 |
| 9,831,605 | B2 | 11/2017 | Buck et al. | |
| 9,941,641 | B1 | 4/2018 | Jiang et al. | |
| 9,979,136 | B1 * | 5/2018 | Wu | H01R 13/6597 |
| 9,985,391 | B1 | 5/2018 | Wang | |
| 10,050,369 | B1 * | 8/2018 | Yang | H01R 13/26 |
| 10,283,910 | B1 | 5/2019 | Chen et al. | |
| 10,411,376 | B1 | 9/2019 | Wang et al. | |
| 10,411,411 | B2 * | 9/2019 | Tang | H01R 13/6582 |
| 10,411,414 | B2 * | 9/2019 | Zhu | H01R 13/504 |
| 10,651,589 | B1 | 5/2020 | Wang et al. | |
| 10,763,608 | B1 | 9/2020 | Wang et al. | |
| 10,840,622 | B2 * | 11/2020 | Sasame | H01R 13/6585 |
| 10,847,936 | B2 * | 11/2020 | Tang | H01R 13/502 |
| 11,025,013 | B2 * | 6/2021 | Little | H01R 12/72 |
| 11,050,176 | B2 | 6/2021 | Yang et al. | |
| 11,108,194 | B2 * | 8/2021 | Lin | H01R 13/6471 |
| 11,189,973 | B2 * | 11/2021 | Chen | H01R 13/11 |
| 11,251,554 | B1 | 2/2022 | Tan et al. | |
| 11,387,605 | B2 * | 7/2022 | Zeng | H01R 31/08 |
| 11,398,693 | B2 * | 7/2022 | Yang | H01R 31/08 |
| 11,431,135 | B2 * | 8/2022 | Wu | H01R 13/6597 |
| 11,581,687 | B2 | 2/2023 | Wang et al. | |
| 11,843,202 | B2 * | 12/2023 | Chen | H01R 13/6581 |
| 12,308,574 | B2 * | 5/2025 | Huang | H01R 12/7005 |
| 2012/0282808 | A1 * | 11/2012 | Luo | H01R 13/6471 439/628 |
| 2014/0004744 | A1 | 1/2014 | Hsu et al. | |
| 2014/0127946 | A1 * | 5/2014 | Ito | H01R 13/6599 439/629 |
| 2014/0211389 | A1 | 7/2014 | Zhou et al. | |
| 2015/0031240 | A1 * | 1/2015 | Yang | H01R 13/6588 439/607.08 |
| 2017/0018880 | A1 * | 1/2017 | Phillips | H01R 13/6585 |
| 2018/0062323 | A1 * | 3/2018 | Kirk | H01R 13/6594 |
| 2018/0198220 | A1 * | 7/2018 | Sasame | H01R 12/716 |
| 2018/0205181 | A1 | 7/2018 | Chen et al. | |
| 2019/0067876 | A1 * | 2/2019 | Tang | H01R 13/6587 |
| 2019/0173209 | A1 * | 6/2019 | Lu | H01R 12/716 |
| 2019/0214753 | A1 | 7/2019 | Jiang et al. | |
| 2019/0214755 | A1 * | 7/2019 | Manickam | H01R 12/721 |
| 2020/0028289 | A1 | 1/2020 | Dai et al. | |
| 2020/0099149 | A1 * | 3/2020 | Xu | H01R 12/75 |
| 2020/0266584 | A1 * | 8/2020 | Lu | H01R 12/75 |
| 2020/0412060 | A1 * | 12/2020 | Hsieh | H01R 13/6471 |
| 2021/0036465 | A1 * | 2/2021 | Tang | H01R 12/721 |
| 2021/0044060 | A1 | 2/2021 | Wu et al. | |
| 2021/0135389 | A1 * | 5/2021 | Jiang | H01R 13/516 |
| 2021/0203107 | A1 * | 7/2021 | Liu | H01R 13/6471 |
| 2021/0320461 | A1 * | 10/2021 | Buck | H01R 12/7082 |
| 2021/0399455 | A1 | 12/2021 | Wang et al. | |
| 2022/0029358 | A1 * | 1/2022 | Lin | H01R 12/727 |
| 2022/0077614 | A1 | 3/2022 | Tan et al. | |
| 2022/0302655 | A1 | 9/2022 | Wang et al. | |
| 2022/0360000 | A1 | 11/2022 | Tan et al. | |
| 2022/0368086 | A1 * | 11/2022 | Li | H01R 13/6587 |
| 2023/0026708 | A1 * | 1/2023 | Carbaugh | H01R 43/20 |
| 2023/0047671 | A1 | 2/2023 | Wang et al. | |
| 2023/0050934 | A1 | 2/2023 | Yin et al. | |
| 2023/0122686 | A1 | 4/2023 | Wang et al. | |
| 2023/0124724 | A1 | 4/2023 | Tan et al. | |
| 2023/0125645 | A1 | 4/2023 | Yin et al. | |
| 2023/0282998 | A1 * | 9/2023 | Komoto | H01R 13/405 439/660 |
| 2023/0411912 | A1 * | 12/2023 | Hsiao | H01R 13/6461 |

FOREIGN PATENT DOCUMENTS

| | | | | |
|---|---|---|---|---|
| CN | 103515792 | A | 1/2014 | |
| CN | 203850501 | U | 9/2014 | |
| CN | 104283080 | A | 1/2015 | |
| CN | 204376132 | U | 6/2015 | |
| CN | 205016785 | U | 2/2016 | |
| CN | 103887641 | B | 6/2016 | |
| CN | 205944534 | U | 2/2017 | |
| CN | 206962152 | U | 2/2018 | |
| CN | 207116835 | U | 3/2018 | |
| CN | 207517943 | U | 6/2018 | |
| CN | 109004437 | A | 12/2018 | |
| CN | 208284706 | U | 12/2018 | |
| CN | 208433570 | U | 1/2019 | |
| CN | 110165448 | A * | 8/2019 | H01R 13/6588 |
| CN | 108649366 | B * | 11/2019 | H01R 13/02 |
| CN | 209675519 | U | 11/2019 | |
| CN | 109659740 | B | 9/2020 | |
| CN | 112103723 | A | 12/2020 | |
| CN | 212380677 | U | 1/2021 | |
| CN | 111769395 | B | 2/2022 | |
| CN | 215816686 | U | 2/2022 | |
| CN | 217691950 | U | 10/2022 | |
| TW | I505580 | B | 10/2015 | |
| TW | I509921 | B | 11/2015 | |
| TW | I593176 | B * | 7/2017 | |
| TW | M546036 | U | 7/2017 | |
| TW | M563682 | U | 7/2018 | |
| TW | M573906 | U | 2/2019 | |
| TW | M584561 | U | 10/2019 | |
| TW | M606366 | U | 1/2021 | |
| TW | M618868 | U | 11/2021 | |
| TW | M621514 | U | 12/2021 | |

OTHER PUBLICATIONS

[No Author Listed], SFF-TA-1001 Specification for Universal ×4 Link Definition for SFF-8639. Rev 1.1. SNIA Advance storage & information technology. May 28, 2018. 20 pages.

Cao et al., High Speed Electrical Connector, U.S. Appl. No. 18/097,778, filed Jan. 17, 2023.

Cao et al., High Speed Electrical Connector, U.S. Appl. No. 18/097,805, filed Jan. 17, 2023.

Hou et al., High Speed Plug Connector, U.S. Appl. No. 18/323,469, filed May 25, 2023.

Mason et al., SAS Standards and Technology Update. Storage Developer Conference (SDC). 2011. 46 pages. URL:https://www.snia.org/sites/default/orig/SDC2011/presentations/monday/HarryMason_SAS%20_Standards_Technology_Updater1.pdf [last accessed Jun. 2, 2022].

He et al., High Speed Electrical Connector, U.S. Appl. No. 18/354,816, filed Jul. 19, 2023.

(56) References Cited

OTHER PUBLICATIONS

Yang et al., PSAS Receptacle Connector, PSAS Plug Connector And Interconnection System Therewith, U.S. Appl. No. 18/240,401, filed Aug. 31, 2023.

* cited by examiner

HIGH SPEED, HIGH PERFORMANCE ELECTRICAL CONNECTOR

RELATED APPLICATIONS

This application claims priority to and the benefit of Chinese Patent Application Serial No. 202222148904.1, filed on Aug. 16, 2022, entitled "ELECTRICAL CONNECTOR," which is herein incorporated by reference in its entirety.

FIELD

This application relates to interconnection systems, such as those including electrical connectors, configured to interconnect electronic assemblies.

BACKGROUND

Electrical connectors are used in many electronic systems. It is generally easier and more cost effective to manufacture a system as several circuit boards, which may be joined together with electrical connectors than to manufacture the system as a single assembly. A known arrangement for joining several printed circuit boards may have one printed circuit board as a backplane. Then, other circuit boards called daughter boards or daughter cards are connected to the backplane by electrical connectors to interconnect these circuit boards.

Certain aspects of electrical connectors may be configured to comply with industry standards such that the connectors can establish an electrical connection between a storage drive implemented according to a standard such as SFF-8639 (e.g., a hard disk drive (HDD), a solid state drive (SSD), an optical disk drive (ODD)) and a circuit board (e.g., a backplane, a midplane, a drive carrier board). Such an electrical system can include a plug connector and a receptacle connector mated with each other. For example, the plug connector may be configured to be mounted to the circuit board, and the receptacle connector may be configured to connect the storage drive to the plug connector. In this way, the electrical system can establish an electrical connection between the storage driver and the circuit board.

BRIEF SUMMARY

Aspects of the present application relate to high speed, high performance electrical connector.

Some embodiments relate to an electrical connector. The electrical connector may include a housing; a member comprising a lossy body and a conductive layer plated on the lossy body; and a plurality of conductive elements held in the housing, the plurality of conductive elements, the plurality of conductive elements comprising signal conductors and ground conductors, wherein the conductive layer of the member electrically connects at least two of the ground conductors.

Optionally, the lossy body of the member may comprise a plurality of openings; and the at least two of the ground conductors comprise ground conductors disposed on opposite sides of the member and connected by the conductive layer in respective openings of the plurality of openings.

Optionally, the lossy body may comprise a plate-shaped portion and a plurality of protrusions protruding from the plate-shaped portion; the conductive layer may comprise a first portion located on the plate-shaped portion and a plurality of second portions located on the plurality of protrusions, the plurality of second portions may be connected by the first portion; and each of the plurality of protrusions may be configured to extend towards a respective ground conductor of the at least two of the ground conductors such that a respective second portion of the plurality of second portions contacts the respective ground conductor.

Optionally, the housing may comprise a base portion and a tongue portion extending from the base portion; the plurality of conductive elements may comprise contact portions disposed on two opposite outer surfaces of the tongue portion and tail portions protruding from a first side of the base portion opposite the tongue portion; the tongue portion may extend from the base portion in a mating direction, and the contact portions of the plurality of conductive elements extend in the mating direction; the base portion may be elongated in a longitudinal direction perpendicular to the mating direction; and the member may extend at least in the tongue portion in the mating direction.

Optionally, the member may extend to a joint between the base portion and the tongue portion.

Optionally, each of the plurality of conductive elements further may comprise an intermediate portion extending between the contact portion and the tail portion; and the member may extend along substantially the entire length of the contact portions and intermediate portions of the signal conductors and the ground conductors in the mating direction.

Some embodiments relate to an electrical connector. The electrical connector may include a housing; a plurality of conductive elements held by the housing in one or more rows, each of the plurality of conductive elements comprising a contact portion, a tail portion opposite the contact portion, and an intermediate portion extending between the contact portion and the tail portion, the plurality of conductive elements comprising pairs of signal conductors and ground conductors disposed between the pairs of the signal conductors; and a member disposed adjacent a row of the one or more rows of conductive elements, the member comprising a lossy body having a plurality of openings extending therethrough, and a conductive layer plated on the lossy body.

Optionally, each of the plurality of openings may at least partially overlap with the contact portions of a respective pair of signal conductors.

Optionally, the conductive layer may comprise nickel and/or gold.

Optionally, the lossy body may comprise a binder and a filler in the binder.

Optionally, the housing may comprise a base portion and a tongue portion extending from the base portion; the tongue portion may extend from the base portion in a mating direction; the base portion may be elongated in a longitudinal direction perpendicular to the mating direction; and the member may comprise a plurality of protrusions each elongated in the mating direction and contacting a respective ground conductor.

Optionally, at least one opening of the plurality of openings may be disposed between every adjacent two protrusions of the plurality of protrusions.

Optionally, the conductive layer may provide a shortened conductive path between adjacent two protrusions of the plurality of protrusions.

Optionally, the housing may comprise two rows of terminal slots extending from the base portion along two opposite outer surfaces of the tongue portion, respectively, and a chamber disposed between the two rows of terminal slots; the member may be disposed in the chamber; and the conductive layer of the member may be at least exposed by terminals slots of the two rows of terminal slots that may be configured to receive the ground conductor.

Some embodiments relate to an electrical connector. The electrical connector may include a housing; a plurality of conductive elements held by the housing, each of the plurality of conductive elements comprising a contact portion, a tail portion opposite the contact portion, and an intermediate portion extending between the contact portion and the tail portion; and a member disposed in the housing, the member comprising a lossy body and a conductive layer plated on the lossy body, the lossy body comprising a plate-shaped portion and a plurality of protrusions protruding from the plate-shaped portion and elongated in a mating direction.

Optionally, the housing comprising a base portion and a tongue portion extending from the base portion; the base portion may be elongated in a longitudinal direction; the plurality of conductive elements may be arranged in a first group of conductive elements and a second group of conductive elements in the longitudinal direction on opposite sides of the member; at least one group of the first group of conductive elements and the second group of conductive elements may comprise a plurality of pairs of signal conductors and ground conductors disposed between adjacent pairs of the plurality of pairs of signal conductors, each pair of the plurality of signal conductors may be configured as a differential signal pair; and the conductive layer electrically connects the ground conductors by contacting the ground conductor.

Optionally, each group of the first group of conductive elements and the second group of conductive elements may comprise a plurality of pairs of signal conductors and ground conductors disposed between adjacent pairs of the plurality of pairs of signal conductors; the plurality of protrusions may comprise a plurality of first protrusions extending towards the ground conductors of the first group of conductive elements and a plurality of second protrusions extending towards the ground conductors of the second group of conductive elements; the conductive layer may comprise a plurality of first portions located on the plurality of first protrusions and a plurality of second portions located on the plurality of second protrusions; and each of the plurality of first portions contacts a respective ground conductor of the ground conductors of the first group of conductive elements, and each of the plurality of second portions contacts a respective ground conductor of the ground conductors of the second group of conductive elements.

Optionally, the plurality of first protrusions may be offset from the plurality of second protrusions in the longitudinal direction.

Optionally, the plurality of pairs of signal conductors of the first group of conductive elements may be configured according to PCIe; and/or the plurality of pairs of signal conductors of the second group of conductive elements may be configured according to SAS/SATA/SATA Express.

Optionally, the lossy body of the member may comprise at least one opening; and each of the at least one opening may extend through the member with at least one of the at least one opening disposed between every two adjacent protrusions of the plurality of protrusions.

Some embodiments relate to an electrical connector. The electrical connector may comprise: an insulative housing comprising a base portion and a tongue portion extending from the base portion; a member disposed in the insulative housing, the member comprising a lossy body and a conductive layer plated on the lossy body; and a plurality of conductive elements held in the insulative housing on opposite sides of the member with contact portions of the plurality of conductive elements exposed through two opposite outer surfaces of the tongue portion and with tail portions of the plurality of conductive elements protruding from a first side of the base portion opposite to the tongue portion, the plurality of conductive elements comprising signal conductors and ground conductors. The member may be configured such that the conductive layer may be in contact with at least some of the ground conductors and electrically connects the at least some of the ground conductors together.

Optionally, the tongue portion may extend from the base portion in a mating direction, and the contact portions of the plurality of conductive elements may be oriented in the mating direction, and the member may be in the shape of a plate and may extend at least in the tongue portion in the mating direction.

Optionally, the member may span a joint between the base portion and the tongue portion.

Optionally, each of the plurality of conductive elements further may comprise an intermediate portion extending between the contact portion and the tail portion, and the member may extend along substantially the entire length of the contact and intermediate portions of the signal conductors and the ground conductors in the mating direction.

Optionally, the base portion may be elongated in a longitudinal direction perpendicular to the mating direction, and an extending range of the member in the longitudinal direction may at least partially overlap with the signal conductors and the ground conductors.

Optionally, the member may be oriented parallelly to the mating direction and to the longitudinal direction.

Optionally, the insulative housing may comprise a first row of terminal slots and a second row of terminal slots extending from the first side of the base portion through the base portion to the two opposite outer surfaces of the tongue portion, respectively, and each of the plurality of conductive elements may be held in a corresponding terminal slot of the first row of terminal slots and the second row of terminal slots, and the insulative housing further may comprise a chamber disposed between the first row of terminal slots and the second row of terminal slots, and the member may be disposed in the chamber.

Optionally, the chamber may be opened to the first side of the base portion, and the member may be configured to be inserted into the chamber from the first side of the base portion.

Optionally, the lossy body may comprise a plate-shaped portion and a plurality of protrusions protruding from the plate-shaped portion, the conductive layer may comprise a first portion located on the plate-shaped portion and a plurality of second portions located on the plurality of protrusions, the plurality of second portions may be connected by the first portion, each of the plurality of protrusions may be configured to extend towards a corresponding ground conductor of the at least some of the ground conductors such that a corresponding second portion of the plurality of second portions on the protrusions may be in contact with the corresponding ground conductor.

Optionally, the insulative housing may comprise a plurality of terminal slots extending from the first side of the base portion through the base portion to the two opposite outer surfaces of the tongue portion, each of the plurality of conductive elements may be held in a corresponding terminal slot of the plurality of terminal slots, the corresponding second portion may be exposed at a bottom of one of the plurality of terminal slots for the corresponding ground conductor.

Optionally, the corresponding second portion may be in contact with at least the contact portion of the corresponding ground conductor.

Optionally, each of the plurality of conductive elements may comprise an intermediate portion extending between the contacting portion and the tail portion, the intermediate portion may comprise a first section held in the base portion and a second section held by the tongue portion, the corresponding second portion may be in contact with the first and second sections of the intermediate portion of the corresponding ground conductor.

Optionally, the tongue portion may extend from the base portion in a mating direction, and the contact portions of the plurality of conductive elements may be oriented in the mating direction, terminal along the entire length of the base portion in the mating direction.

Optionally, the base portion may be elongated in a longitudinal direction, and the plurality of conductive elements may be arranged in a first group of conductive elements and a second group of conductive elements in the longitudinal direction on the opposite sides of the shield, at least one group of the first group of conductive elements and the second group of conductive elements may comprise ground conductors and a plurality of pairs of signal conductors, each pair of the plurality of signal conductors may be configured as a differential signal pair, the ground conductors may separate each pair of the plurality of pairs of signal conductors from each other, the conductive layer may electrically connect the ground conductors together by contacting each of the plurality of second portions with the corresponding ground conductor of the ground conductors.

Optionally, each group of the first group of conductive elements and the second group of conductive elements may comprise ground conductors and a plurality of pairs of signal conductors, each pair of the plurality of pairs of signal conductors may be configured as a differential signal pair, the ground conductors may separate each pair of the plurality of pairs of signal conductors from each other, the plurality of protrusions comprise a plurality of first protrusions extending towards the ground conductors of the first group of conductive elements and a plurality of second protrusions extending towards the ground conductors of the second group of conductive elements, the plurality of second portions may comprise a plurality of first subparts located on the plurality of first protrusions and a plurality of second subparts located on the plurality of second protrusions, each of the plurality of first subparts may be in contact with a corresponding ground conductor of the ground conductors of the first group of conductive elements, and each of the plurality of second subparts may be in contact with a corresponding ground conductor of the ground conductors of the second group of conductive elements.

Optionally, the plurality of first protrusions may be offset from the plurality of second protrusions in the longitudinal direction.

Optionally, the plurality of pairs of signal conductors of the first group of conductive elements may be configured according to PCIe.

Optionally, the plurality of pairs of signal conductors of the second group of conductive elements may be configured according to SAS/SATA/SATA Express.

Optionally, the member may define at least one opening, and each of the at least one opening may extend through the member with at least one of the at least one opening disposed between every two adjacent protrusions of the plurality of protrusions.

Optionally, the tongue portion may extend from the base portion in a mating direction, and the contact portions of the plurality of conductive elements may be oriented in the mating direction, each of the plurality of protrusions and each of the plurality of second portions may be elongated in the mating direction.

Optionally, each of the plurality of conductive elements may comprise an intermediate portion extending between the contact portion and the tail portion, the insulative housing may comprise a slot recessed into the base portion from the first side of the base portion, the electrical connector further may comprise an insulative lead assembly housing configured to surround the intermediate portions of the signal conductors and the ground conductors to hold the signal conductors and the ground conductors in place relative to each other and configured to be inserted into the slot to retain the signal conductors and the ground conductors in the insulative housing.

Optionally, the lead assembly housing may comprise a body portion configured to surround the intermediate portions of the signal conductors and the ground conductors, and a plurality of channels recessed into the body portion from a surface of the body portion facing the shield, each of the plurality of channels may be configured to allow a corresponding protrusion of the plurality of protrusions to be disposed therein such that the corresponding second portion may be in contact with the intermediate portion of a corresponding ground conductor of the at least some of the ground conductors.

Optionally, the lead assembly housing further may comprise a projection protruding from a surface of the body portion facing away from the shield, the insulative housing may comprise a notch recessed into the insulative housing from an inner wall of the slot, the projection and the notch may be configured such that when the lead assembly housing may be inserted into the slot, the projection may be received in the notch to secure the lead assembly housing in the slot.

Optionally, the notch may extend through the insulative housing to allow the projection to be touched from an outer side of the insulative housing when the projection may be received in the notch, so as to release the projection from the notch.

Optionally, the lossy body may be made of a lossy material.

Optionally, the conductive layer may be a nickel plating or a gold plating.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures may be represented by a like numeral. For purposes of clarity, not every component may be labeled in every drawing. In the drawings.

LIST OF REFERENCE NUMERALS

Figure 1:
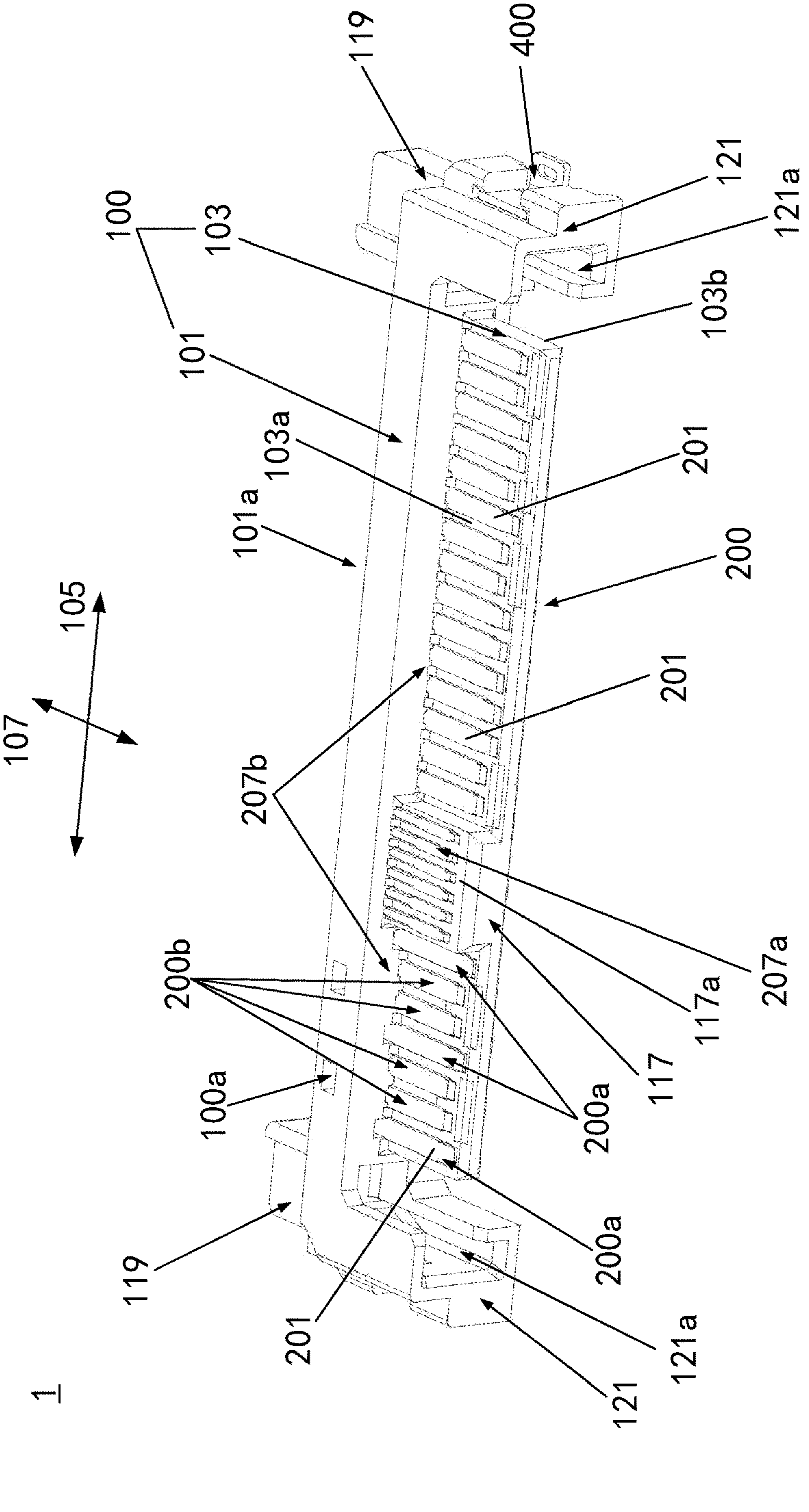
FIG. 1 is a top, front perspective view of an electrical connector, according to some embodiments.
Figure 2:
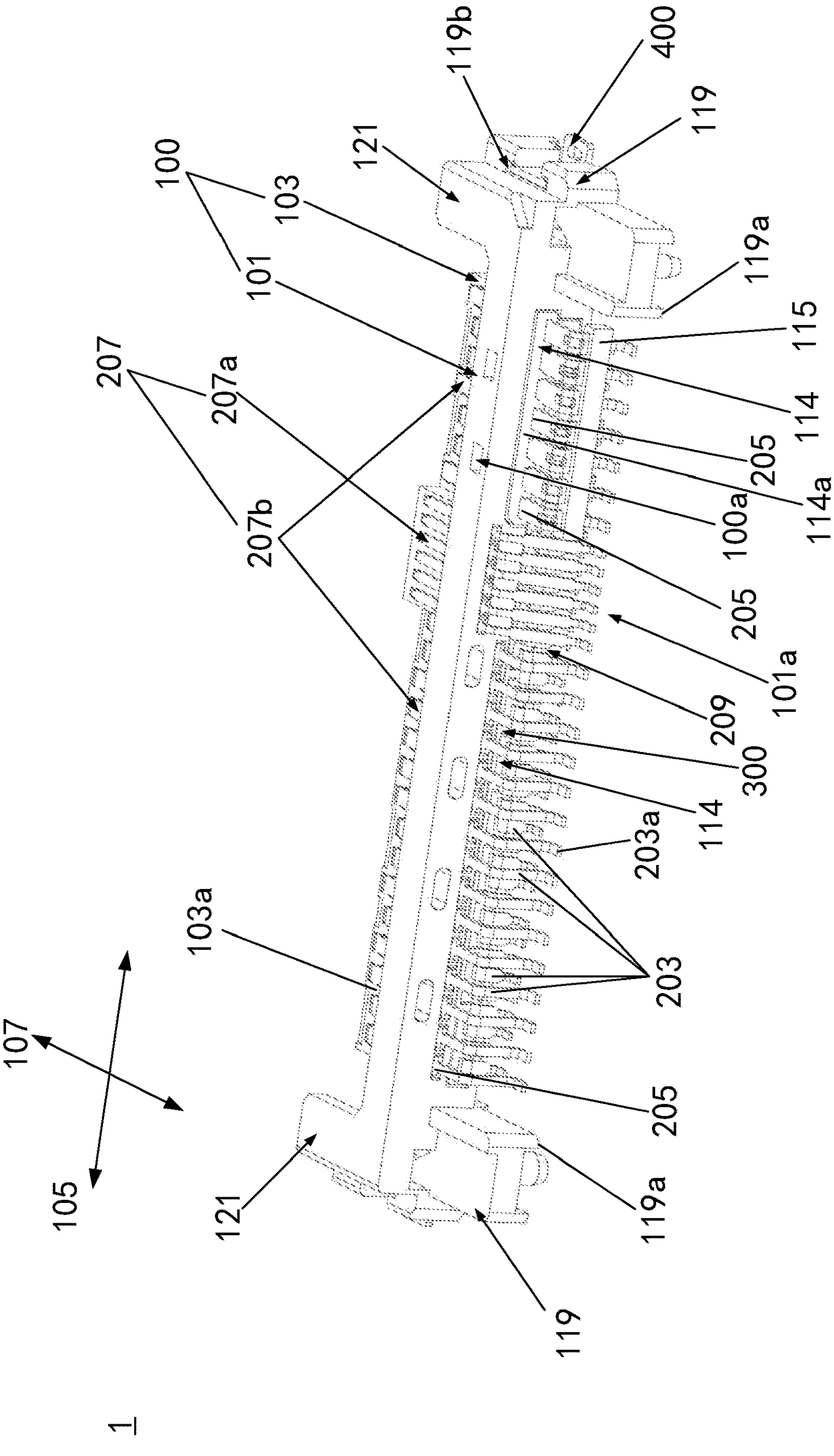
FIG. 2 is top, rear perspective view of the electrical connector of FIG. 1.
Figure 3:
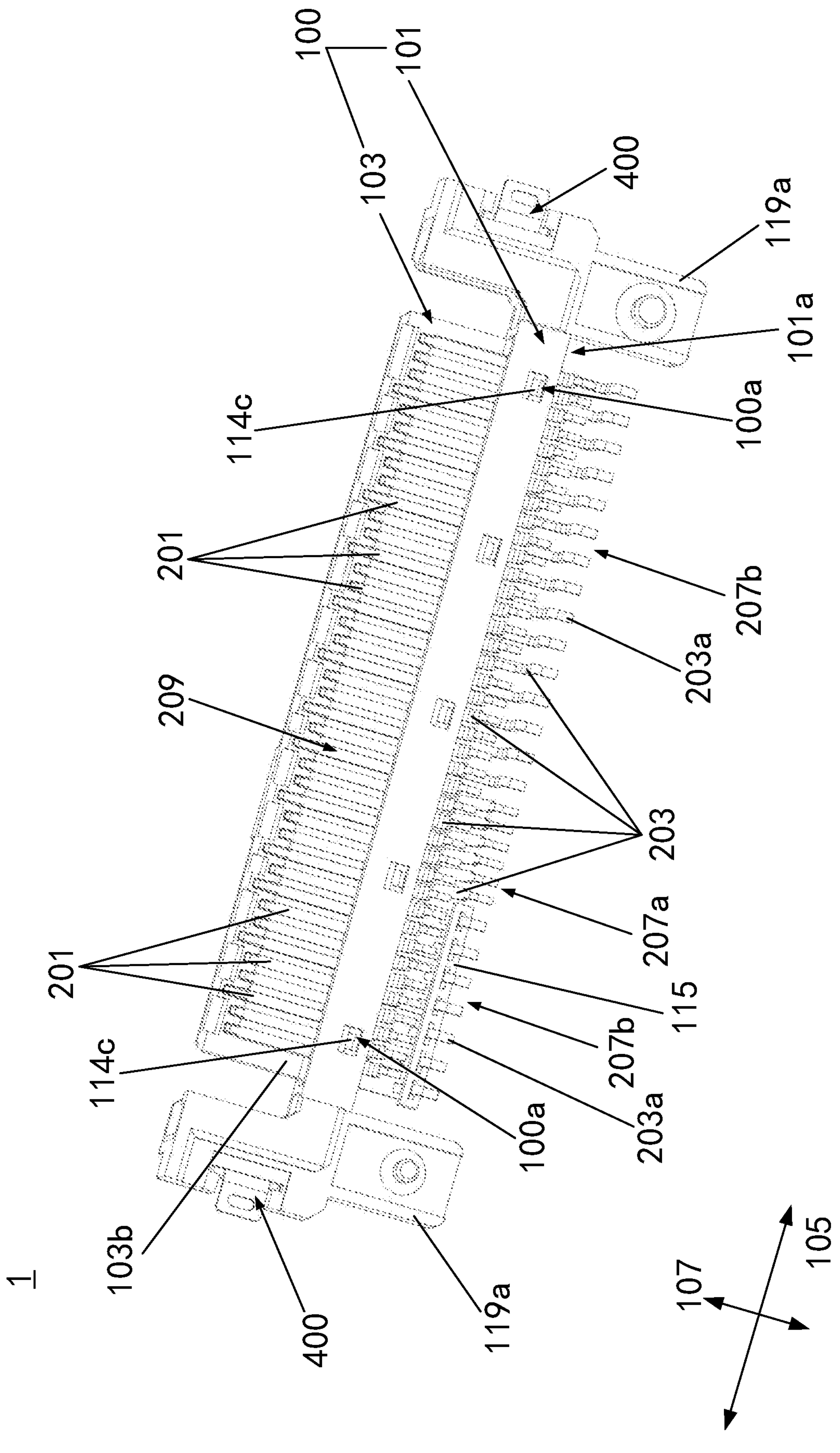
FIG. 3 is a bottom perspective view of the electrical connector of FIG. 1.

1 electrical connector
100 insulative housing
100*a* notch
101 base portion
101*a* first side
103 tongue portion
103*a* first outer surface
103*b* second outer surface
105 longitudinal direction
107 mating direction
109 terminal slot
109*a* first row of terminal slots
109*b* second row of terminal slots
110 chamber
113 slot
114 lead assembly housing
114*a* body portion
114*b* channel
114*c* projection
115 lead assembly housing
117 first platform
117*a* first platform surface
119 mounting portion
119*a* mounting surface
119*b* board lock receiving feature
121 receiving portion
121*a* receiving slot
200 conductive element
200*a* ground conductor
200*b* signal conductor
201 contact portion
203 tail portion
203*a* end segment
205 intermediate portion
205*a* first section
205*b* second section
207 first group of conductive elements
207*a* first subgroup of conductive elements
207*b* second subgroup of conductive elements
209 second group of conductive elements
300 member
301 lossy body
303 conductive layer
305 plate-shaped portion
307 protrusion
307*a* first protrusion
307*b* second protrusion
309 first portion
311 second portion
311*a* first subpart
311*b* second subpart
313 opening
400 board lock.

DETAILED DESCRIPTION

The Inventors have recognized and appreciated connector designs that satisfy electrical and mechanical requirements to support greater bandwidth through high frequency operation. Some of these techniques may synergistically support higher frequency connector operation, satisfy the physical requirements set by industry standards such as PCIeSAS, and meet requirements for mass manufacturing, including cost, time and reliability. A connector satisfying the mechanical requirements of the PCIeSAS specification is used as an example of a connector in which these techniques have been applied.

An electrical connector may have one or more rows of conductive elements. Some of the conductive elements in a row may serve as high-speed signal conductors. Optionally, some of the conductive elements may serve as low-speed signal conductors or power conductors. Some of the low-speed signal conductors and/or power conductors may also be designated as grounds, referencing the signals carried on the signal conductors or providing a return path for those signals. It should be appreciated that ground conductors need not to be connected to earth ground, but may carry reference potentials, which may include earth ground, DC voltages or other suitable reference potentials.

The electrical connector may have a member disposed between adjacent rows of conductive elements. The member may have a body made of a lossy material and a conductive layer plated on the body such that the conductive layer electrically connects at least some of the ground conductors. The body of the member may have openings and/or protrusions disposed and sized such that the conductive layer plated on the body provides shortened conductive paths between the ground conductors. The member can be configured to enable tuning the impedance at desired regions such as the mating region. Such a configuration meets signal integrity requirements in connectors designed for high speed transmission, while conforming to a standard that constrains mating and mounting interfaces.

FIGS. 1 to 16 illustrate in an electrical connector 1 according to some embodiments of the present application. The electrical connector 1 may, for example, be configured as a plug connector to be combined with a mated receptacle connector (not shown) to form an electrical connector assembly. Such an electrical connector assembly can provide an industry-standard interface such as SFF-8639 to establish an electrical connection between a storage drive (such as a hard disk drive (HDD), a solid state drive (SSD), an optical disk drive (ODD)) and a circuit board (such as a backplane, a midplane, a drive carrier board). The electrical connector 1 may be configured to be mounted to the circuit board, and the receptacle connector may be configured to connect the storage drive to the electrical connector 1, whereby the electrical connector 1 can establish an electrical connection between the circuit board and the receptacle connector, and the receptacle connector can establish an electrical connection between the storage drive and the electrical connector 1. In this way, the electrical connector assembly composed of the electrical connector 1 and the receptacle connector may establish an electrical connection between the storage driver and the circuit board, thereby enabling signal and/or power transfer. Such an electrical connector assembly may be referred to as a "storage drive connector".

As shown in FIGS. 1 to 12, the electrical connector 1 includes an insulative housing 100. The insulative housing 100 includes a base portion 101 and a tongue portion 103 extending from base portion 101. The base portion 101 is elongated in the longitudinal direction 105. The tongue portion 103 extends from the base portion 101 in the mating direction 107 and is configured to be inserted into a receptacle connector (not shown) that mates with the electrical connector 1. The longitudinal direction 105 may be perpendicular to the mating direction 107. The base portion 101 is integral with the tongue portion 103. The insulative housing 100 may be formed by any suitable manufacturing process in the art such as injection molding. The insulative housing 100 may be formed of an insulative material. Examples of insulative materials that are suitable for forming the insulative housing 100 include, but are not limited to, plastic, nylon, liquid crystal polymer (LCP), polyphenyline sulfide (PPS), high temperature nylon or polyphenylenoxide (PPO) or polypropylene (PP).

Figure 9:
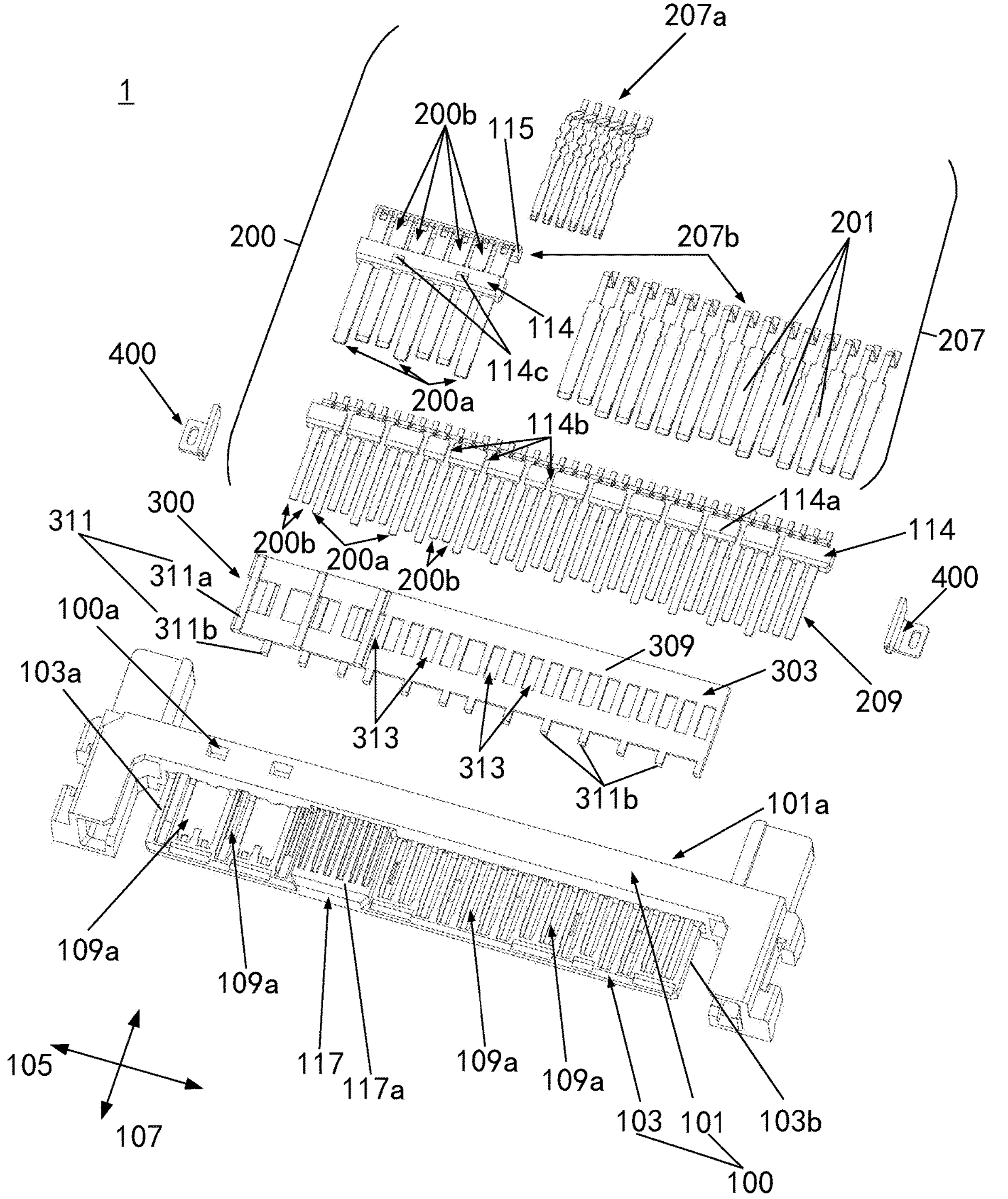
FIG. 9 is an exploded perspective view of the electrical connector of FIG. 1.
Figure 10:
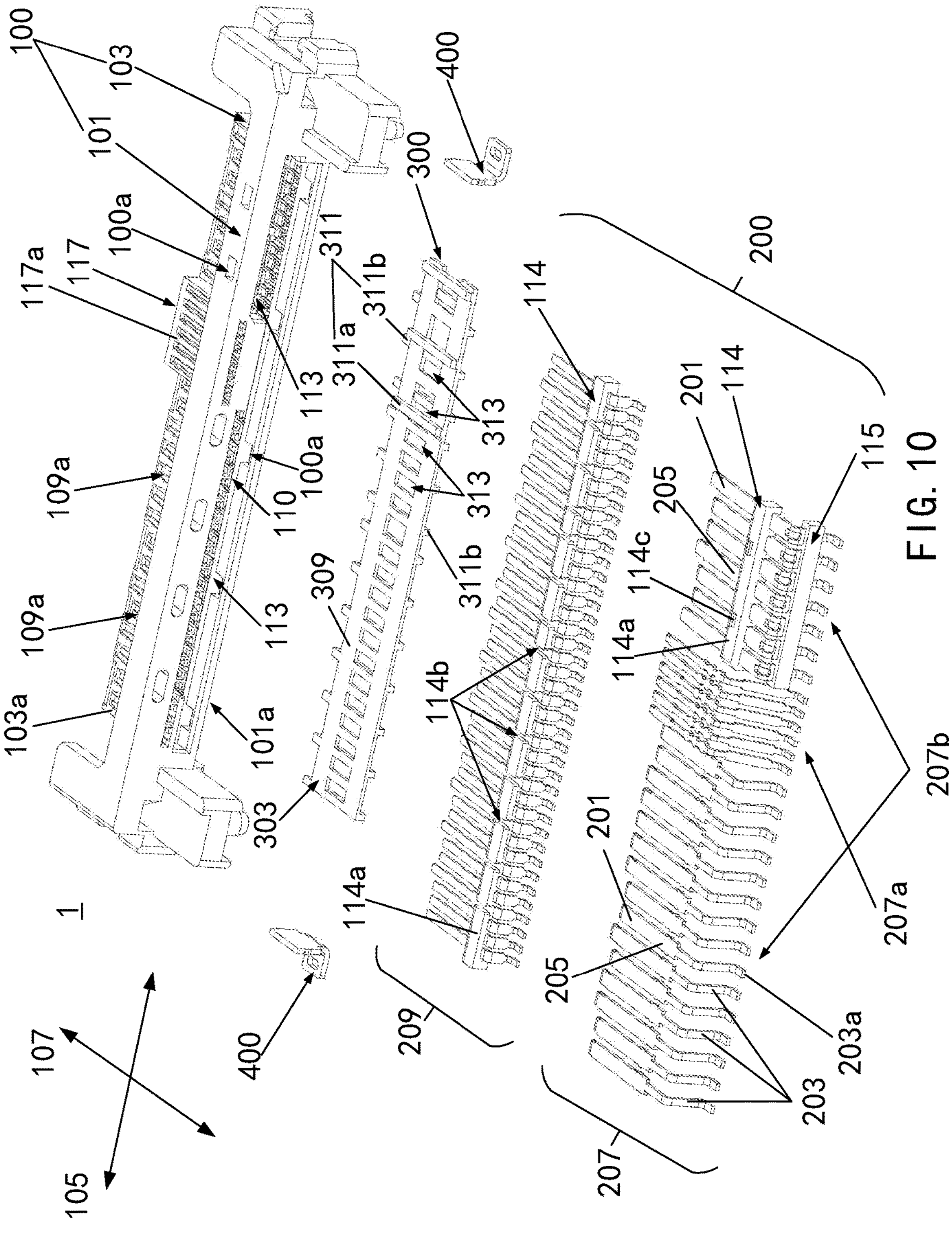
FIG. 10 is another exploded perspective view of the electrical connector of FIG. 1.
Figure 11:
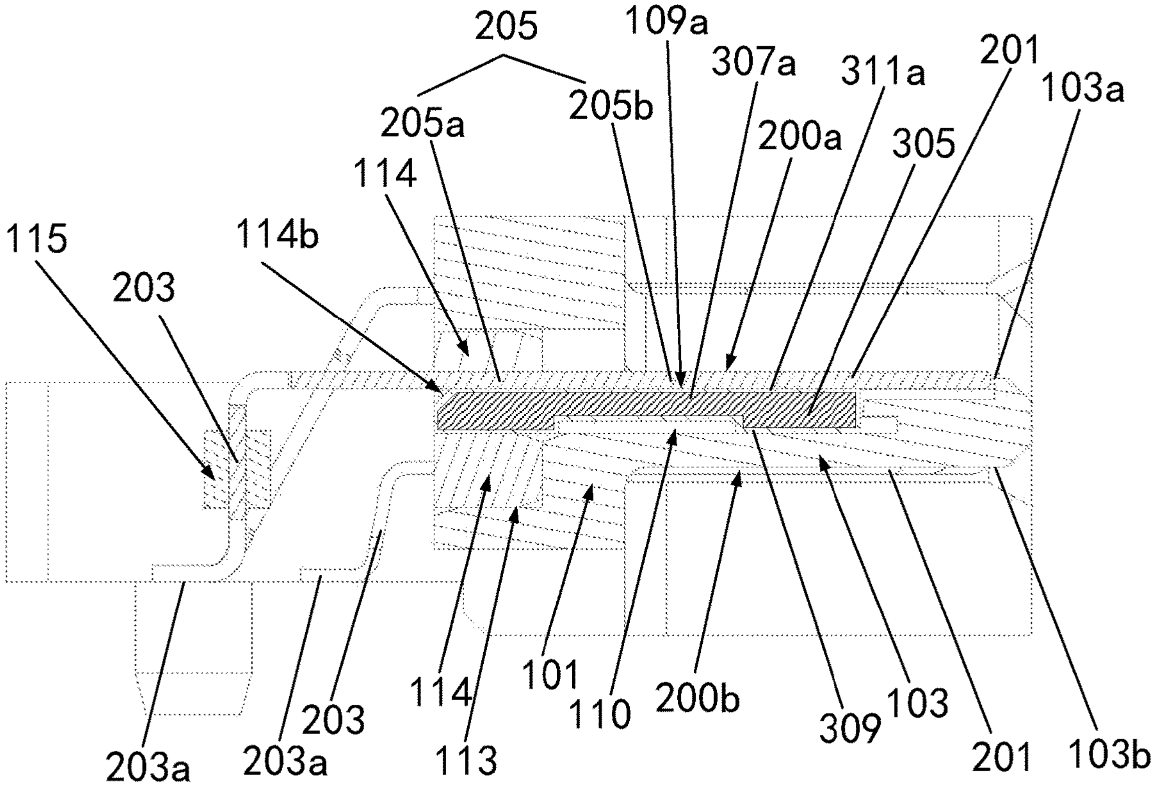
FIG. 11 is a cross-sectional view of the electrical connector of FIG. 1 taken along line I-I in FIG. 7.
Figure 12:
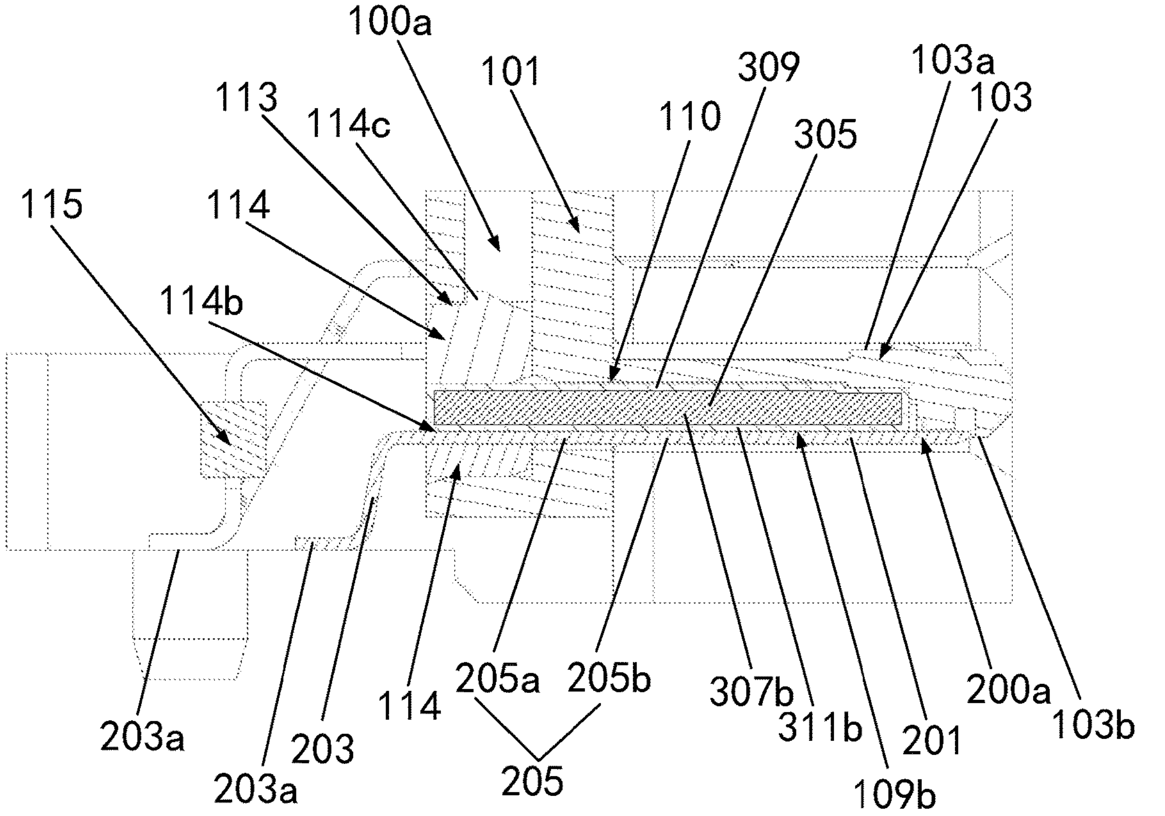
FIG. 12 is a cross-sectional view of the electrical connector of FIG. 1 taken along line II-II in FIG. 7.

As shown in FIGS. 1 to 3 and 5 to 10, the electrical connector 1 further includes a plurality of conductive elements 200. Each of the plurality of conductive elements 200 is formed from a conductive material. The conductive material suitable for forming the conductive elements 200 may be a metal or a metal alloy, such as a copper or copper alloy. With further reference to FIGS. 9 and 10, each conductive element 200 may include a contact portion 201, a tail portion 203, and an intermediate portion 205 extending between the contact portion 201 and the tail portion 203. The contact portion 201 is oriented in the mating direction 107. As shown in FIGS. 11 and 12, the intermediate portion 205 may include a first section **205*a* held in the base portion 101 and a second section 205*b* held by the tongue portion 103. The contact portion 201 may be configured to establish an electrical connection with a corresponding mating terminal (not shown) of the receptacle connector. In particular, when the electrical connector 1 is mated with the receptacle connector, the contact portions of the corresponding mating terminals of the receptacle connector may resiliently press against the contact portions 201 of the conductive elements 200 of the electrical connector 1. The tail portion 203 may be configured to be mounted to a circuit board, and specifically attached to a conductive trace or other conductive structure on the circuit board, by utilizing any suitable technique such as a surface mount technology (SMT) and a pin immersion solder paste method (PiP). It should be appreciated that the present application is not limited thereto. The plurality of conductive elements 200 may include ground conductors 200*a* and signal conductors 200*b***.

As shown in FIGS. 2, 4, and 8 to 14, the electrical connector 1 further includes a member 300 disposed in the insulative housing 100. The member 300 includes a lossy body 301 (FIGS. 15 and 16) and a conductive layer 303 plated on the lossy body 301 (FIGS. 9 to 12).

The lossy body 301 is a member formed from a lossy material. Materials that dissipate a sufficient portion of the electromagnetic energy interacting with that material to appreciably impact the performance of a connector may be regarded as lossy. A meaningful impact results from attenuation over a frequency range of interest for a connector. In some configurations, lossy material may suppress resonances within ground structures of the connector and the frequency range of interest may include the natural frequency of the resonant structure, without the lossy material in place. In other configurations, the frequency range of interest may be all or part of the operating frequency range of the connector.

For testing whether a material is lossy, the material may be tested over a frequency range that may be smaller than or different from the frequency range of interest of the connector in which the material is used. For example, the test frequency range may extend from 10 GHz to 25 GHz or 1 GHz to 5 GHz. Alternatively, lossy material may be identified from measurements made at a single frequency, such as 10 GHz or 15 GHz.

Loss may result from interaction of an electric field component of electromagnetic energy with the material, in which case the material may be termed electrically lossy. Alternatively or additionally, loss may result from interaction of a magnetic field component of the electromagnetic energy with the material, in which case the material may be termed magnetically lossy.

Electrically lossy materials can be formed from lossy dielectric and/or poorly conductive materials. Electrically lossy material can be formed from material traditionally regarded as dielectric materials, such as those that have an electric loss tangent greater than approximately 0.01, greater than 0.05, or between 0.01 and 0.2 in the frequency range of interest. The "electric loss tangent" is the ratio of the imaginary part to the real part of the complex electrical permittivity of the material.

Electrically lossy materials can also be formed from materials that are generally thought of as conductors, but are relatively poor conductors over the frequency range of interest. These materials may conduct, but with some loss, over the frequency range of interest such that the material conducts more poorly than a conductor of an electrical connector, but better than an insulator used in the connector. Such materials may contain conductive particles or regions that are sufficiently dispersed such that they do not provide high conductivity or otherwise are prepared with properties that lead to a relatively weak bulk conductivity compared to a good conductor such as pure copper over the frequency range of interest. Die cast metals or poorly conductive metal alloys, for example, may provide sufficient loss in some configurations.

Electrically lossy materials of this type typically have a bulk conductivity of about 1 Siemen/meter to about 100,000 Siemens/meter, or about 1 Siemen/meter to about 30,000 Siemens/meter, or 1 Siemen/meter to about 10,000 Siemens/meter. In some embodiments, material with a bulk conductivity of between about 1 Siemens/meter and about 500 Siemens/meter may be used. As a specific example, material with a conductivity between about 50 Siemens/meter and 300 Siemens/meter may be used. However, it should be appreciated that the conductivity of the material may be selected empirically or through electrical simulation using known simulation tools to determine a conductivity that provides suitable signal integrity (SI) characteristics in a connector. The measured or simulated SI characteristics may be, for example, low cross talk in combination with a low signal path attenuation or insertion loss, or a low insertion loss deviation as a function of frequency.

It should also be appreciated that a lossy body need not have uniform properties over its entire volume. A lossy body, for example, may have an insulative skin or a conductive core, for example. A member may be identified as lossy if its properties on average in the regions that interact with electromagnetic energy sufficiently attenuate the electromagnetic energy.

In some embodiments, lossy material is formed by adding to a binder a filler that contains particles. In such an embodiment, a lossy body may be formed by molding or otherwise shaping the binder with filler into a desired form. The lossy material may be molded over and/or through openings in conductors, which may be ground conductors or shields of the connector. Molding lossy material over or through openings in a conductor may ensure intimate contact between the lossy material and the conductor, which may reduce the possibility that the conductor will support a resonance at a frequency of interest. This intimate contact may, but need not, result in an Ohmic contact between the lossy material and the conductor.

Alternatively or additionally, the lossy material may be molded over or injected into insulative material, or vice versa, such as in a two shot molding operation. The lossy material may press against or be positioned sufficiently near a ground conductor such that there is appreciable coupling to a ground conductor. Intimate contact is not a requirement for the electrical coupling between the lossy material and the conductor, as sufficient electrical coupling, such as a capacitive coupling, between a lossy body and a conductor may yield the desired result. For example, in some scenarios, 100 pF of coupling between a lossy body and a ground conductor may provide an appreciable impact on the suppression of the resonance in the ground conductor. In other examples with frequencies in the range of approximately 10 GHz or higher, a reduction in the amount of electromagnetic energy in a conductor may be provided by sufficient capacitive coupling between a lossy material and the conductor with a mutual capacitance of at least about 0.005 pF, such as in a range between about 0.01 pF to about 100 pF, between about 0.01 pF to about 10 pF, or between about 0.01 pF to about 1 pF. To determine whether lossy material is coupled to a conductor, coupling may be measured at a test frequency, such as 15 GHz or over a test range, such as 10 GHz to 25 GHz.

To form an electrically lossy material, the filler may be conductive particles. Examples of conductive particles that may be used as a filler to form an electrically lossy material include carbon or graphite formed as fibers, flakes, nanoparticles, or other types of particles. Various forms of fiber, in woven or non-woven form, coated or non-coated may be used. Non-woven carbon fiber is one suitable material. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake.

Preferably, the fillers will be present in a sufficient volume percentage to allow conducting paths to be created from particle to particle. For example, when metal fiber is used, the fiber may be present in about 3% to 30% by volume. The amount of filler may impact the conducting properties of the material, and the volume percentage of filler may be lower in this range to provide sufficient loss.

The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

While the above-described binder materials may be used to create an electrically lossy material by forming a binder around conducting particle fillers, lossy materials may be formed with other binders or in other ways. In some examples, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Materials with higher loss tangents may also be used.

In some embodiments, a magnetically lossy material may be formed of a binder or matrix material filled with particles that provide that layer with magnetically lossy characteristics. The magnetically lossy particles may be in any convenient form, such as flakes or fibers. Ferrites are common magnetically lossy materials. Materials such as magnesium ferrite, nickel ferrite, lithium ferrite, yttrium garnet or aluminum garnet may be used. Ferrites will generally have a loss tangent above 0.1 at the frequency range of interest. Presently preferred ferrite materials have a loss tangent between approximately 0.1 and 1.0 over the frequency range of 1 GHz to 3 GHz and more preferably a magnetic loss tangent above 0.5 over that frequency range.

Practical magnetically lossy materials or mixtures containing magnetically lossy materials may also exhibit useful amounts of dielectric loss or conductive loss effects over portions of the frequency range of interest. Suitable materials may be formed by adding fillers that produce magnetic loss to a binder, similar to the way that electrically lossy materials may be formed, as described above.

It is possible that a material may simultaneously be a lossy dielectric or a lossy conductor and a magnetically lossy material. Such materials may be formed, for example, by using magnetically lossy fillers that are partially conductive or by using a combination of magnetically lossy and electrically lossy fillers.

A lossy body also may be formed in a number of ways. In some examples the binder material, with fillers, may be molded into a desired shape and then set in that shape. In other examples the binder material may be formed into a sheet or other shape, from which a lossy body of a desired shape may be cut. In some embodiments, a lossy body may be formed by interleaving layers of lossy and conductive material such as a metal foil. These layers may be rigidly attached to one another, such as through the use of epoxy or other adhesive, or may be held together in any other suitable way. The layers may be of the desired shape before being secured to one another or may be stamped or otherwise shaped after they are held together. As a further alternative, a lossy body may be formed by plating plastic or other insulative material with a lossy coating, such as a diffuse metal coating.

The conductive layer 303 may be a conductive metal plating, such as a nickel (Ni) plating or a gold (Au) plating. It should be appreciated that the conductive layer 303 may be any other suitable metal plating. The lossy body 301 may be formed into a desired shape through any suitable process in the art, such as molding or die casting, and then the conductive layer 303 may be plated on the lossy body 301 through any suitable plating process in the art. The conductive layer 303 may have any suitable thickness. For example, the thickness of the conductive layer may be between 0.1 μm and 20 μm. The thickness of the conductive layer may preferably be between 1 μm and 10 μm, and more preferably between 1.27 μm and 5 μm.

Figure 13:
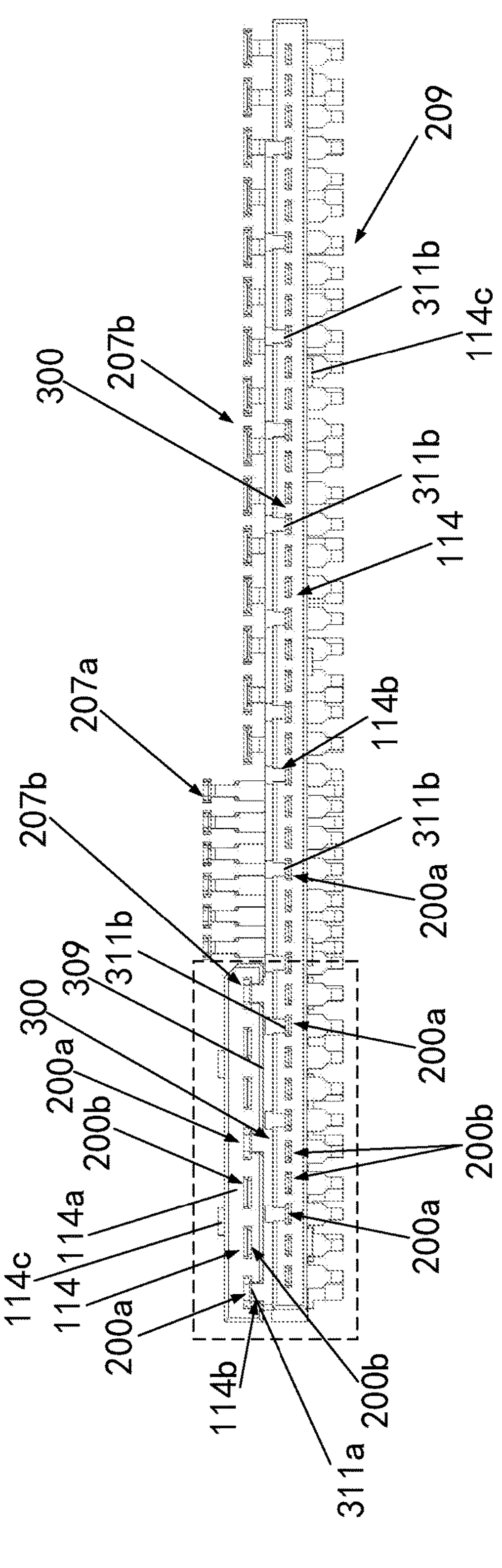
FIG. 13 is a front view of the electrical connector of FIG. 7, with the insulative housing hidden.
Figure 14:
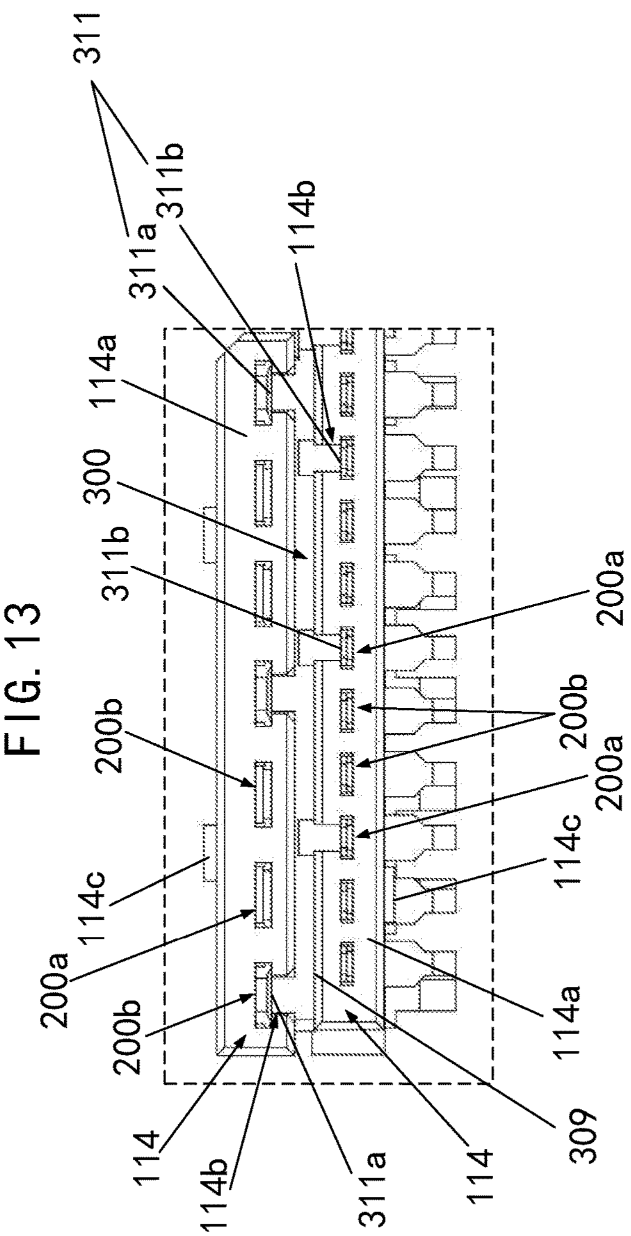
FIG. 14 is an enlarged view of the area circled by dashed lines in FIG. 13.

As shown in FIGS. 1 to 3 and 5 to 8, the plurality of conductive elements 200 are held in the insulative housing 100 on opposite sides of the member 300 with the contact portions 201 of the plurality of conductive elements 200 exposed through the two opposite outer surfaces (i.e., the first outer surface 103*a* and the second outer surface 103*b*) of the tongue portion 103, and with the tail portions 203 of the plurality of conductive elements 200 protruding from a first side 101*a* of the base portion 101 opposite to the tongue portion 103. As illustrated in FIGS. 13 and 14, the member 300 is configured such that the conductive layer 303 is in contact with at least some of the ground conductors 200*a* and electrically connects these ground conductors 200*a* together. In this way, it is possible to provide shielding between the conductive elements 200 on the opposite sides of the member 300 and to reduce crosstalk. That is, in this way, it is possible to provide shielding between different signal channels and to reduce crosstalk. This can improve signal integrity and thus provide improved high frequency transmission performance for the electrical connector 1. Furthermore, the lossy body 301 can be electrically coupled to the ground conductors 200*a* via the conductive layer 303. This allows the effect of electrical resonance to be reduced, thereby improving signal integrity. In particular, when the electrical resonance occurs at a frequency within the operating frequency range of the electrical connector 1, the integrity of the high-speed signal passing through the electrical connector 1 deteriorates. The deterioration in the integrity of the signal passing through the electrical connector 1 is partially caused by the loss of signal energy coupled into the resonant signal, which means that less signal energy passes through the electrical connector 1. The deterioration in the integrity of the signal passing through the electrical connector 1 is also partially caused by the coupling of the resonant signal from the ground conductors 200*a* to the signal conductors 200*b*. The resonant signal accumulates and possesses a high amplitude, so when the resonant signal is coupled from the ground conductors 200*a* to the signal conductors 200*b*, it will generate a large amount of noise that interferes with the signal. Sometimes, the resonant signal coupled to the signal conductors 200*b* is also referred to as crosstalk. The frequency at which electrical resonance occurs is related to the length of the ground conductors supporting the electrical resonance, the reason is that the wavelength of the resonant signal is related to the length of the ground conductors supporting the resonance, and the frequency is inversely proportional to the wavelength. Electrically coupling the lossy body 301 to the ground conductors 200*a* may enable energy coupled into the ground conductors 200*a* and accumulated into a resonant signal to be dissipated in the lossy body 301, which makes the occurrence of electrical resonance less likely, thereby increasing signal integrity and improving the operating frequency range of the electrical connector 1.

As shown in FIGS. 9 and 10, the member 300 may be in the shape of a plate. The member 300 may be oriented parallelly to the mating direction 107 and the longitudinal direction 105 in the insulative housing 100. In some embodiments, as illustrated in FIGS. 11 and 12, the member 300 extends at least in the tongue portion 103 of the insulative housing 100 in the mating direction 107. For example, the member 300 may span a joint between the base portion 101 and the tongue portion 103 of the insulative housing 100. As another example, the member 300 extends along substantially the entire length of the contact portions 201 and the intermediate portions 205 of the signal conductors 200*b* and the ground conductors 200*a* in the mating direction 107. As used herein, the term "substantially" means, for example, most, or almost all, or all, or an amount in the range of about 80% to about 100%.

In some embodiments, as illustrated in FIG. 13, an extending range of the member 300 in the longitudinal direction 105 at least overlaps with the signal conductors 200*b* and the ground conductors 200*a*. For example, the extending range of the member 300 in the longitudinal direction 105 may overlap with all of the conductive elements 200.

Figure 4:
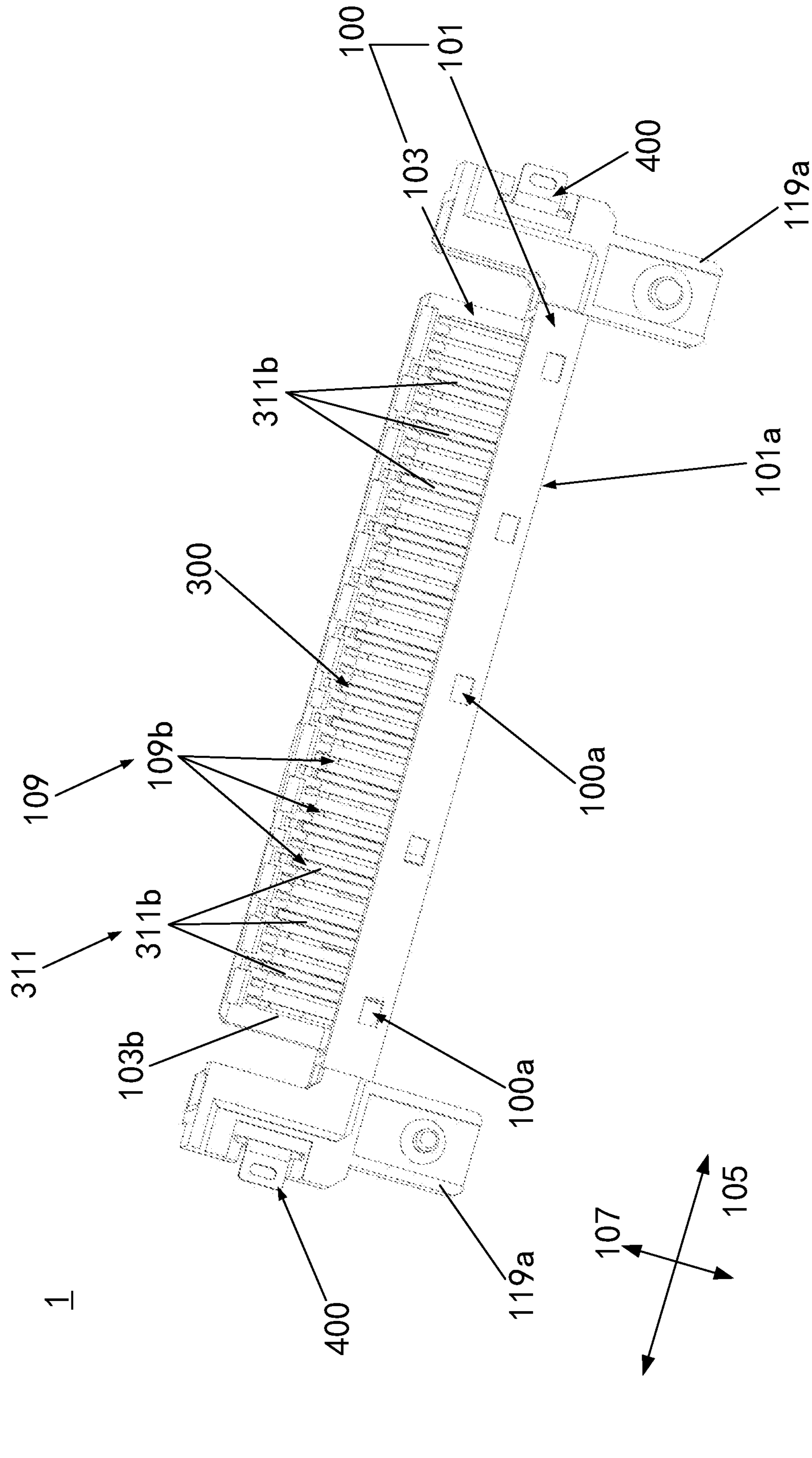
FIG. 4 is a perspective view of the electrical connector of FIG. 3, with conductive elements hidden.
Figure 5:
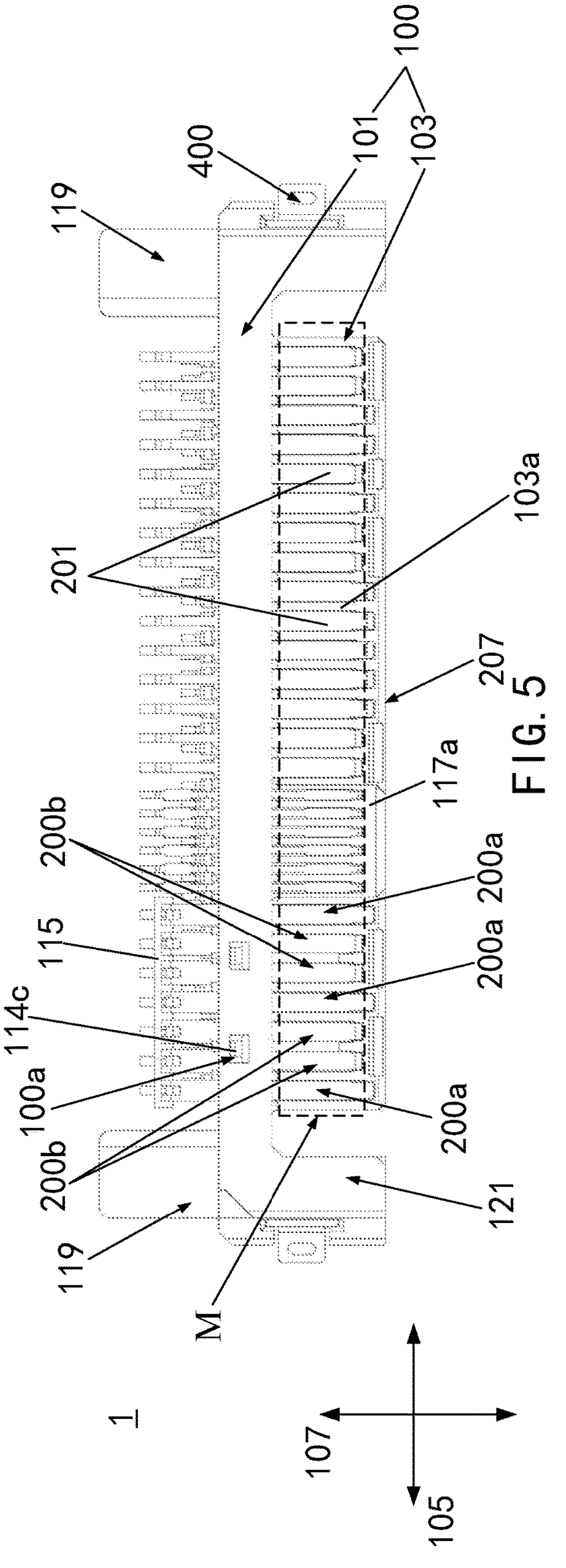
FIG. 5 is a top view of the electrical connector of FIG. 1.
Figure 6:
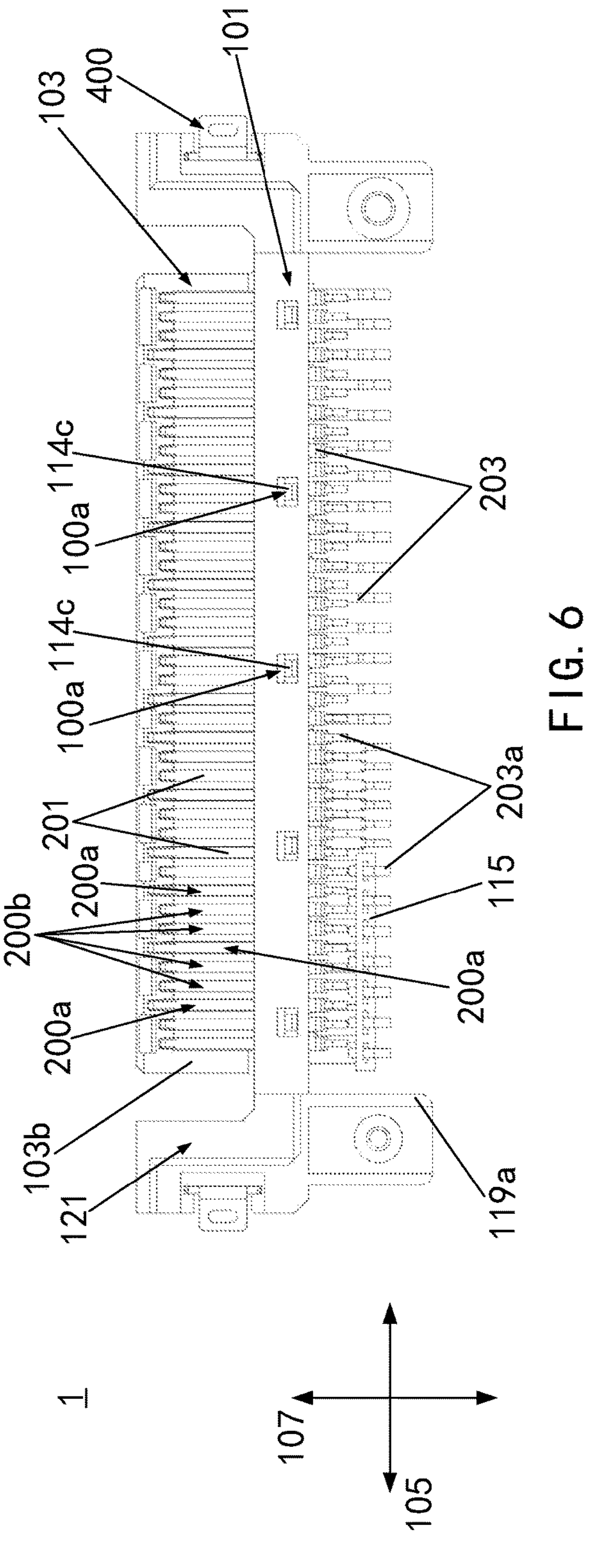
FIG. 6 is a bottom view of the electrical connector of FIG. 1.
Figure 7:
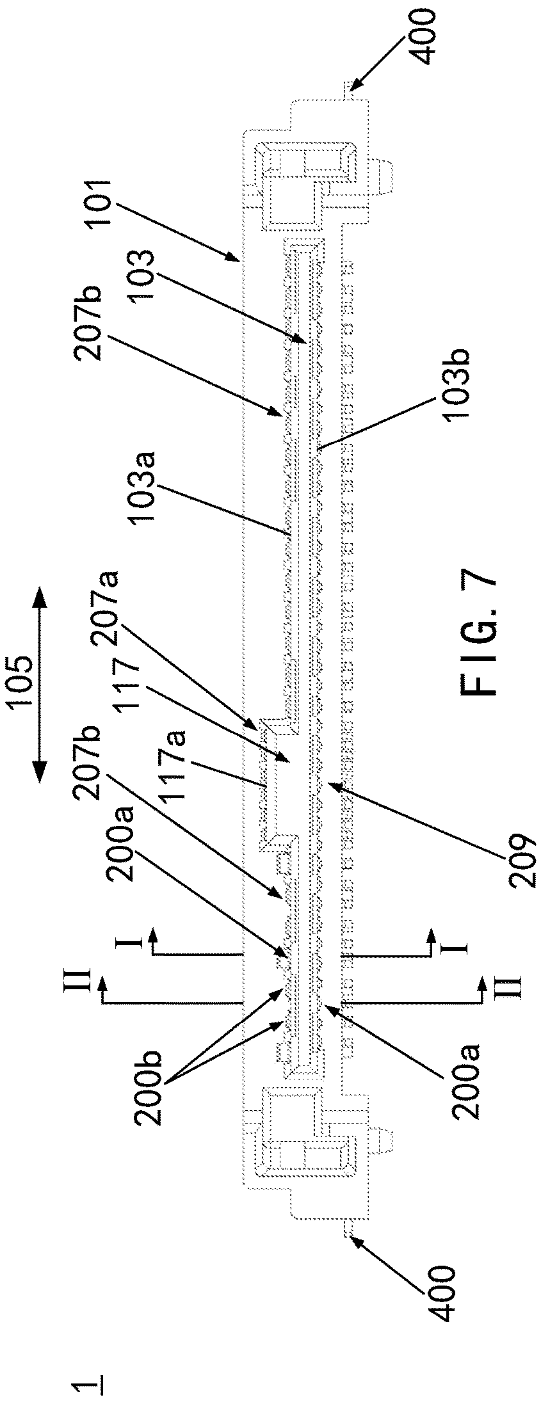
FIG. 7 is a front view of the electrical connector of FIG. 1.
Figure 8:
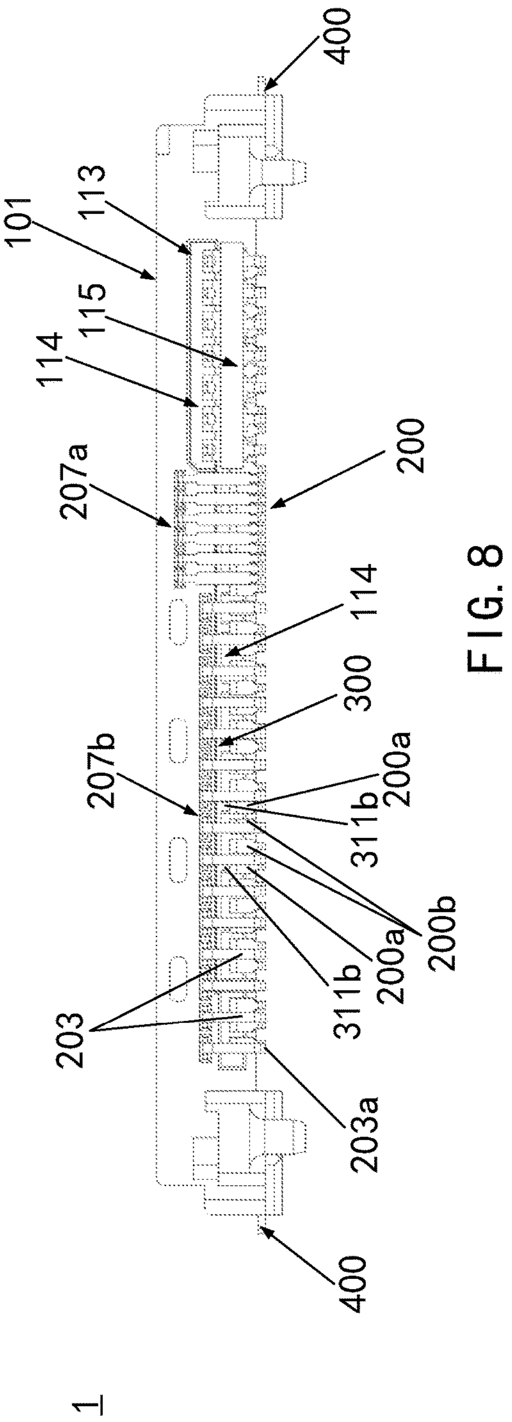
FIG. 8 is a rear view of the electrical connector of FIG. 1.

As shown in FIGS. 4, 9, and 10, the insulative housing 100 includes a plurality of terminal slots 109 extending from the first side 101*a* of the base portion 101 through the base portion 101 to the two opposite outer surfaces (i.e., the first outer surface 103*a* and the second outer surface 103*b*) of the tongue portion 103. Each of the plurality of conductive elements 200 is held in a corresponding one of the plurality of terminal slots 109. In particular, the plurality of terminal slots 109 includes a first row of terminal slots 109*a* and a second row of terminal slots 109*b* extending from the first side 101*a* of the base portion 101 through the base portion 101 to the first outer surface 103*a* and the second outer surface 103*b* of the tongue portion 103, respectively. Each of the plurality of conductive elements 200 is held in a corresponding terminal slot of the first row of terminal slots 109*a* and the second row of terminal slots 109*b*. As illustrated in FIG. 10, the insulative housing 100 further includes a chamber 110 disposed between the first row of terminal slots 109*a* and the second row of terminal slots 109*b* to receive the member 300. When the member 300 is disposed in the chamber 110, the conductive elements 200 are located on both sides of the member 300 and the conductive layer 303 of the member 300 is in contact with the at least some of the ground conductors 200*a* and electrically connects the at least some of the ground conductors 200*a* together.

In some embodiments, with further reference to FIG. 10, the chamber 110 is opened to the first side 101*a* of the base portion 101, and the member 300 is configured to be inserted into the chamber 110 from the first side 101*a* of the base portion 101. In this case, the member 300 is a prefabricated insert to be inserted into the chamber 110 of the insulative housing 100. This can improve the assembling efficiency of the electrical connector 1.

Figure 15:
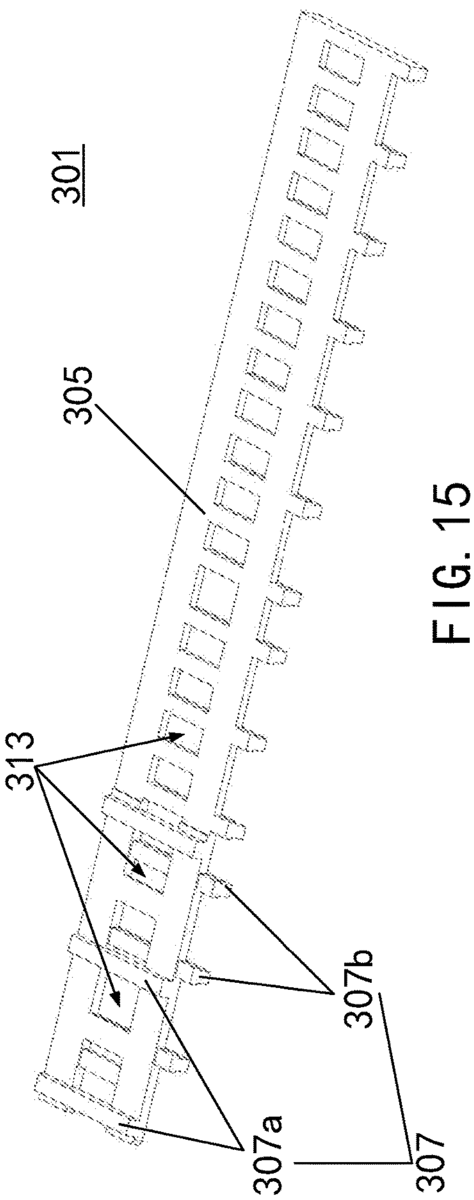
FIG. 15 is a perspective view of a lossy body of the electrical connector of FIG. 1.
Figure 16:
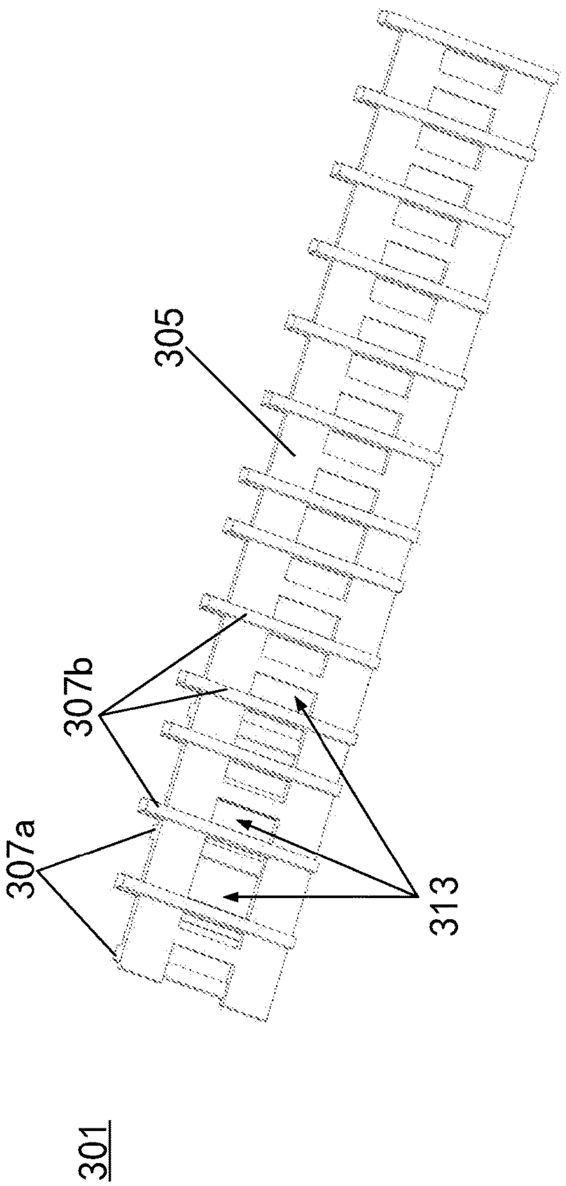
FIG. 16 is another perspective view of the lossy body of FIG. 15.

FIGS. 15 and 16 schematically illustrate the lossy body 301 of the member 300. The lossy body 301 includes a plate-shaped portion 305 and a plurality of protrusions 307 protruding from the plate-shaped portion 305. Turning to FIGS. 9, 10, 13, and 14, the conductive layer 303 includes a first portion 309 located on the plate-shaped portion 305 of the lossy body 301 and a plurality of second portions 311 located on the plurality of protrusions 307 of the lossy body 301. The plurality of second portions 311 of the conductive layer 303 are connected via the first portion 309. For example, the conductive layer 303 may be plated over the entire lossy body 301 such that the first portion 309 and the second portions 311 are continuous. As another example, the first portion 309 may be etched after the conductive layer 303 is plated, thereby forming a plurality of sections that are configured to provide shorter conductive paths between the plurality of second portions 311.

As shown in FIGS. 11 to 14, each of the plurality of protrusions 307 of the lossy body 301 is configured to extend towards a corresponding ground conductor 200*a* of the at least some of the ground conductors 200*a*, such that a corresponding second portion 311 of the plurality of second portions 311 on a corresponding protrusion 307 is in contact with the corresponding ground conductor 200*a*. In this way, the conductive layer 303 of the member 300 is in contact with the at least some of the ground conductors 200*a* and electrically connects the at least some of the ground conductors 200*a* together.

As illustrated in FIG. 4, the second portion 311 of the conductive layer 303 is exposed at a bottom of a terminal slot 109 of the plurality of terminal slots 109 for the corresponding ground conductor 200*a* so as to be in contact with the ground conductor 200*a*. The signal conductors 200*b* are separated from the member 300 by the insulative housing 100. In some examples, each of the plurality of protrusions 307 and each of the plurality of second portions 311 may be elongated in the mating direction 107.

In some embodiments, the second portion 311 of the conductive layer 303 is in contact with at least the contact portion 201 of the corresponding ground conductor 200*a*. In some embodiments, as shown in FIGS. 11 and 12, the second portion 311 of the conductive layer 303 may be in contact with the first section 205*a* and the second section 205*b* of the intermediate portion 205 of the corresponding ground conductor 200*a*. In some embodiments, the second portion 311 of the conductive layer 303 may be in contact with the corresponding ground conductor 200*a* along substantially the entire length of the base portion 101 of the insulative housing 100 in the mating direction 107.

As shown in FIGS. 1 to 3, 5 to 10, and 13, the plurality of conductive elements 200 are arranged in a first group of conductive elements 207 and a second group of conductive elements 209 along the longitudinal direction 105 on the opposite sides of the member 300. Each of the first outer surface 103*a* and the second outer surface 103*b* of the tongue portion 103 of the insulative housing 100 is parallel to the longitudinal direction 105 and to the mating direction 107. The contact portion 201 of each of the first group of conductive elements 207 is exposed through the first outer surface 103*a* and oriented in the mating direction 107, and the contact portion 201 of each of the second group of conductive elements 209 is exposed through the second outer surface 103*b* and oriented in the mating direction 107. At least one group of the first group of conductive elements 207 and the second group of conductive elements 209 may include ground conductors 200*a* and a plurality of pairs of signal conductors 200*b*, wherein each pair of the plurality of pairs of signal conductors 200*b* is configured as a differential signal pair for transmitting differential signals. In particular, a first signal conductor of each pair of signal conductors 200*b* may be energized by a first voltage, and a second signal conductor thereof may be energized by a second voltage. The voltage difference between the first and second signal conductors represents a signal. The ground conductors 200*a* separate each pair of the plurality of pairs of signal conductors 200*b* from each other. For example, these ground conductors 200*a* ("G") and signal conductors ("S") 200*b* may be arranged in a "G-S-S-G-S-S . . . G-S-S-G" pattern, with each pair of signal conductors 200*b* sharing a ground conductor 200*a*. Separating each pair of the plurality of pairs of signal conductors 200*b* from each other by the ground conductors 200*a* can reduce crosstalk between signals, thereby improving signal integrity. In this case, the conductive layer 303 may electrically connect the ground conductors 200*a* together by each of the plurality of second portions 311 contacting the corresponding one of the ground conductors 200*a*.

It should be appreciated that the plurality of conductive elements 200 may include other conductive elements. These other conductive elements may be the same as or similar to (e.g., having different dimensions from those of) the ground conductor 200*a* and the signal conductor 200*b*, and/or may include power terminals for transmitting power. It is noted that although the ground conductors are identified as 200*a*, and the signal conductors are identified as 200*b* among the accompanying drawings, this does not mean that the terminals are limited to having identical dimensions.

In some embodiments, the plurality of pairs of signal conductors 200*b* of the first group of conductive elements 207 are configured according to PCIe, and/or the plurality of pairs of signal conductors 200*b* of the second group of conductive elements 209 are configured according to SAS/SATA/SATA Express.

In some embodiments, as shown in FIGS. 1 to 3, 5 to 10, and 13, each group of the first group of conductive elements 200 and the second group of conductive elements 200 includes ground conductors 200*a* and a plurality of pairs of signal conductors 200*b*, wherein each pair of the plurality of pairs of signal conductors 200*b* is configured as a differential signal pair, and the ground conductors 200*a* separate each pair of the plurality of pairs of signal conductors 200*b* from each other. As shown in FIGS. 15 and 16, the plurality of protrusions 307 of the lossy body 301 includes a plurality of first protrusions 307*a* configured to extend towards the ground conductors 200*a* of the first group of conductive elements 200 and a plurality of second protrusions 307*b* configured to extend towards the ground conductors 200*a* of the second group of conductive elements 200. As shown in FIGS. 9 to 10 and 13 to 14, the plurality of second portions 311 of the conductive layer 303 include a plurality of first subparts 311*a* located on the plurality of first protrusions 307*a*, and a plurality of second subparts 311*b* located on the plurality of second protrusions 307*b*. Each of the plurality of first subparts 311*a* is in contact with the corresponding one of the ground conductors 200*a* of the first group of conductive elements 200, and each of the plurality of second subparts 311*b* is in contact with the corresponding one of the ground conductors 200*a* of the second group of conductive elements 200.

Alternatively or additionally, the plurality of first protrusions 307*a* are offset from the plurality of second protrusions 307 in the longitudinal direction 105. In other words, the plurality of first protrusions 307*a* are not aligned with the plurality of second protrusions 307*b* in the longitudinal direction 105. Through providing the plurality of first protrusions 307*a* offset from the plurality of second protrusions 307*b* in the longitudinal direction 105, it is possible to allow for an offset between the conductive elements 200 of the first group of conductive elements 207 and those of the second group of conductive elements 209 to further reduce crosstalk between the first group of conductive elements 207 and the second group of conductive elements 209, thereby further improving signal integrity. It should be appreciated that as the plurality of first protrusions 307*a* are offset from the plurality of second protrusions 307 in the longitudinal direction 105, the plurality of first subparts 311*a* of the conductive layer 303 are also offset from the plurality of second subparts 311*b* in the longitudinal direction 105.

In some other embodiments, only one group of the first group of conductive elements 207 and the second group of conductive elements 209 includes ground conductors 200*a* and a plurality of pairs of signal conductors 200*b*, wherein each pair of the plurality of pairs of signal conductors 200*b* is configured as a differential signal pair and the ground conductors 200*a* separate each pair of the plurality of pairs of signal conductors 200*b* from each other. In this case, the plurality of protrusions 307 of the lossy body 301 only includes a plurality of protrusions extending towards the ground conductors 200*a* of the only one group of conductive elements (e.g., only including a first protrusion 307*a* or a second protrusion 307*b*) to electrically couple with the ground conductors 200*a*.

It should be appreciated that the signal conductors 200*b* may include at least one pair of signal conductors 200*b*. Each pair of the at least one pair of signal conductors 200*b* includes two adjacent signal conductors 200*b* and is configured as a differential signal pair for transmitting differential signals.

As shown in FIGS. 9 and 10, the member 300 defines at least one opening 313. Each of the at least one opening 313 extends through the member 300 and at least partially overlaps with the contact portions 201 of a corresponding pair of signal conductors 200*b* of the at least one pair of signal conductors 200*b*. When the electrical connector 1 is mated with the receptacle connector, the electrical connector 1 and the receptacle connector define a mating region (as schematically represented by the dashed square M in FIG. 5) on the tongue portion 103 of the insulative housing 100 along the mating direction 107. The mating region may be defined, for example, as an area in which one or both of the ground conductors 200*a* and the signal conductors 200*b* of the electrical connector 1 overlap with corresponding mating terminals of the receptacle connector. The inventor has recognized that when the total open area of the member 300 increases, the impedance at the mating region also increases. For example, if the member 300 does not have any opening, its total open area is zero, the impedance at the mating region is substantially lower than the expected impedance of the electrical connector assembly composed of the electrical connector 1 and the receptacle connector, resulting in a mismatch of the impedance at the mating region with respect to the expected impedance of the electrical connector assembly.

Configuring each of the at least one opening 313 of the member 300 to at least partially overlap with the contact portions 201 of the corresponding pair of signal conductors 200*b* of the at least one pair of signal conductors 200*b* enables that the impedance at the mating region can substantially match with the expected impedance of the electrical connector assembly composed of the electrical connector 1 and the receptacle connector when the plug connector 1 is mated with the receptacle connector, and the crosstalk can be reduced.

In some embodiments, the at least one opening 313 is configured to completely overlap with the mating region where the contact portions 201 of at least one pair of signal conductors 200*b* mate with the corresponding mating terminals of the receptacle connector when the electrical connector 1 is plugged into the receptacle connector. In some embodiments, more than one opening 313 may be disposed in the member 300 along the contact portions 201 of a pair of signal conductors 200*b*. The area of each opening 313 may be reduced to reduce crosstalk at the mating area. For example, when the electrical connector 1 is mated with the receptacle connector, the area of each opening 313 may be smaller than the wavelength of the signal transmitted across the signal conductors 200*b* of the electrical connector 1 and the corresponding mating terminals of the receptacle connector. The area of the opening 313 may be reduced as the frequency of the signal transmitted across the signal conductors 200*b* and the corresponding mating terminals increases. Thus, the number and area of openings 313 and the total open area of member 300 may be configured to substantially match the impedance at the mating region with the expected impedance of the electrical connector assembly and to reduce crosstalk.

In some embodiments, as illustrated in FIGS. 15 and 16, at least one opening 313 is disposed between every adjacent two protrusions 307 of the plurality of protrusions 307 of the lossy body 301. There will be a conductive path through the conductive layer 303 on the lossy body 301 between the ground conductors 200*a* corresponding to every adjacent two protrusions 307. On the one hand, providing the opening 313 facilitates the plastic filling during manufacturing and material saving. On the other hand, due to the provision of the opening 313, the conductive path between the corresponding ground conductors 200*a* can be shortened. This facilitates the improvement of the performance of the member 300, thereby further reducing crosstalk.

In some embodiments, as shown in FIGS. 10 to 12, the insulative housing 100 includes a slot 113 recessed into the base portion 101 from the first side 101*a* of the base portion 101, and the electrical connector 1 further includes an insulative lead assembly housing 114. The lead assembly housing 114 is configured to surround the intermediate portions 205 of the signal conductors 200*b* and the ground conductor 200*a* to retain the signal conductors 200*b* and the ground conductors 200*a* in place relative to each other and is configured to be inserted into slot 113 to retain the signal conductors 200*b* and the ground conductors 200*a* in the insulative housing 100. The lead assembly housing 114 may be formed from an insulative material. Examples of insulative materials that are suitable for forming the lead assembly housing 114 include, but are not limited to, plastic, nylon, liquid crystal polymer (LCP), polyphenyline sulfide (PPS), high temperature nylon or polyphenylenoxide (PPO) or polypropylene (PP). For example, the lead assembly housing 114 may be overmolded over the signal conductors 200*b* and the ground conductors 200*a*.

Two lead assembly housings 114 are shown in FIGS. 9 and 10 to retain selected conductive elements of the first group of conductive elements 207 and all of the conductive elements of the second group of conductive elements 209, respectively. It should be appreciated that this is only exemplary and that the present application is not limited thereto. Each lead assembly housing 114 includes a body portion 114*a* configured to surround the intermediate portions 205 of the signal conductors 200*b* and the ground conductors 200*a*, and a plurality of channels 114*b* recessed into the body portion 114*a* from a surface of the body portion 114*a* facing the member 300. Each of the plurality of channels 114*b* is configured to allow a corresponding one of the plurality of protrusions 307 of the lossy body 301 to be disposed therein, such that a corresponding one of the second portions 311 of the conductive layer 303 is in contact with the intermediate portion 205 of a corresponding one of the ground conductors 200*a*. In some examples, the width of the channel 114*b* may be less than the width of the ground conductor 200*a* such that the ground conductor 200*a* would not be disengaged from the lead assembly housing 114 via the channel 114*b*.

As shown in FIGS. 9 and 10, the lead assembly housing 114 further includes a projection 114*c* protruding from a surface of the body portion 114*a* facing away from the member 300. As illustrated in FIGS. 10 and 12, the insulative housing 100 includes a notch 100*a* recessed into the insulative housing 100 from an inner wall of the slot 113. The projection 114*c* and the notch 100*a* are configured such that when the lead assembly housing 114 is inserted into the slot 113, the projection is received in the notch 100*a* to secure the lead assembly housing 114 in the slot 113. In this way, the signal conductors 200*b* and the ground conductors 200*a* can be reliably retained in the insulative housing 100.

In some embodiments, as shown in FIGS. 1 to 6 and 9 to 10, the notch 100*a* extends through the insulative housing 100 to allow the projection 114*c* to be touched from an outer side of the insulative housing 100 when the projection 114*c* is received in the notch 100*a*, so as to release the projection 114*c* from the notch 100*a*.

In some embodiments, the electrical connector 1 further includes an insulative lead assembly housing 115. The lead assembly housing 115 is configured to surround the tail portions 203 of the signal conductors 200*b* and the ground conductors 200*a* to further retain the signal conductors 200*b* and the ground conductors 200*a* in place relative to each other. One retention member 115 is schematically shown in FIGS. 2 to 3, 5 to 6, and 8 to 12 to retain the tail portions 203 of a plurality of conductive elements selected from the first group of conductive elements 207.

When assembling the electrical connector 1, the second group of conductive elements 209 held by the lead assembly housing 114 may be inserted into the insulative housing 100, followed by the insertion of the member 300 into the chamber 110 of the insulative housing 100, followed by the insertion of the first group of conductive elements 207 into the insulative housing 100 (the selected conductive elements of the first group of conductive elements 207 are held by another lead assembly housing 114). It should be appreciated that the present application is not limited thereto and that any suitable assembly method and sequence may be used to assemble the electrical connector 1.

In some embodiments, as shown in FIGS. 1 to 2, 5, and 8, the tongue portion 103 of the insulative housing 100 further includes a first platform 117 protruding from the first outer surface 103*a* of the tongue portion 103. The first platform 117 defines a first platform surface 117*a* parallel to the first outer surface 103*a*. It should be appreciated that the first platform surface 117*a* may be considered as part of the first outer surface 103*a*. The first group of conductive elements 207 includes a first subgroup of conductive elements 207*a* and a second subgroup of conductive elements 207*b*. The contact portion 201 of each conductive element 200 of the first subgroup of conductive elements 207*a* of the first group of conductive elements 207 is exposed through the first platform surface 117*a* and oriented in the mating direction 107. The conductive elements 200 of the first subgroup of conductive elements 207*a* and the conductive elements 200 of the second subgroup of conductive elements 207*b* are each aligned in the longitudinal direction 105. The conductive elements 200 of the second group of conductive elements 209 are aligned in the longitudinal direction 105. The first platform 117 may provide a dummy-proof function to prevent the electrical connector 1 from being plugged into the receptacle connector in a wrong orientation, either intentionally or unintentionally.

In some embodiments, as shown in FIGS. 1 to 10, the insulative housing 100 may further include at least one mounting portion 119 (shown as two in the drawings) extending from the base portion 101 in the mating direction 107 opposite to the tongue portion 103. Each of the at least one mounting portion 119 has a mounting surface 119*a* configured to be mounted to a circuit board (not shown), the mounting surface 119*a* is substantially flush with the surfaces of an end segment 203*a* of the tail portion 203 of each of the conductive elements 200 of the first group of conductive elements 207 and an end segment 203*a* of the tail portion 203 of each of the conductive elements 200 of the second group of conductive elements 209 facing towards a mounting direction (not shown) perpendicular to the mating direction 107 and the longitudinal direction 105. It should be appreciated that in some other examples, the electrical connector 1 may be configured such that the mounting direction is parallel to the mating direction 107.

In some examples, as shown in FIGS. 1 to 10, the insulative housing 100 may further include a board lock receiving feature 119*b* formed in the insulative housing 100 adjacent to the mounting portion 119 to receive the board lock 400. The board lock 400 may be used to reliably secure the electrical connector 1 on a circuit board. The board lock 400 is shown in the form of a pressed tab, but it should be appreciated that the present application is not limited thereto.

In some examples, as shown in FIGS. 1 to 10, the insulative housing 100 may further include at least one receiving portion 121 (shown as two in the drawings) extending parallelly to the tongue portion 103 from the base portion 101 in the mating direction 107. Each of the at least one receiving portion 121 has a receiving slot 121*a* configured to receive a corresponding portion (not shown) of the receptacle connector to guide the electrical connector 1 to mate with the receptacle connector.

Having thus described several aspects of several embodiments of a beam-shaping and steering assembly, it is to be appreciated that various alterations, modifications, and improvements will readily occur to those skilled in the art. Such alterations, modifications, and improvements are intended to be part of this disclosure, and are intended to be within the spirit and scope of the invention. While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

For example, although the present application is described in detail above in connection with the embodiments in which the electrical connector 1 is configured as a plug connector, it should be appreciated that the electrical connector 1 may be any other suitable type of connectors.

In the claims, as well as in the specification above, use of ordinal terms such as “first,” “second,” “third,” etc. does not by itself connote any priority, precedence, or order of one element over another or the temporal order in which acts of a method are performed, but are used merely as labels to distinguish one element having a certain name from another element having a same name (but for use of the ordinal term) to distinguish the elements.

The present disclosure is not limited to the details of construction or the arrangements of components set forth in the foregoing description and/or the drawings. Various embodiments are provided solely for purposes of illustration, and the concepts described herein are capable of being practiced or carried out in other ways.

What is claimed is:

1. An electrical connector comprising:

a housing;

a member comprising a lossy body and a conductive layer plated on the lossy body, the lossy body comprising a plurality of first protrusions on a first side and a plurality of second protrusions on a second side of the lossy body opposite the first side, the conductive layer comprising a plurality of first portions on the plurality of first protrusions and a plurality of second portions on the plurality of second protrusions; and a plurality of conductive elements held in the housing, the plurality of conductive elements comprising signal conductors and ground conductors, the plurality of conductive elements comprising a first group of conductive elements and a second group of conductive elements on opposite sides of the member, wherein the conductive layer of the member electrically connects at least a ground conductor in the first group of conductive elements and at least a ground conductor in the second group of conductive elements.

2. The electrical connector of claim 1, wherein:

the lossy body of the member comprises a plurality of openings; and the at least a ground conductor in the first group of conductive elements and the at least a ground conductor in the second group of conductive elements are connected by the conductive layer in respective openings of the plurality of openings.

3. The electrical connector of claim 1, wherein:

the lossy body comprises a plate-shaped portion; and the conductive layer comprises a portion located on the plate-shaped portion.

4. The electrical connector of claim 1, wherein:

the housing comprises a base portion and a tongue portion extending from the base portion;

the plurality of conductive elements comprise contact portions disposed on two opposite outer surfaces of the tongue portion and tail portions protruding from a first side of the base portion opposite the tongue portion;

the tongue portion extends from the base portion in a mating direction, and the contact portions of the plurality of conductive elements extend in the mating direction;

the base portion is elongated in a longitudinal direction perpendicular to the mating direction; and the member extends at least in the tongue portion in the mating direction.

5. The electrical connector of claim 4, wherein the member extends to a joint between the base portion and the tongue portion.

6. The electrical connector of claim 4, wherein:

each of the plurality of conductive elements further comprises an intermediate portion extending between the contact portion and the tail portion; and the member extends along substantially the entire length of the contact portions and intermediate portions of the signal conductors and the ground conductors in the mating direction.

7. An electrical connector comprising:

a housing;

a plurality of conductive elements held by the housing in first and second rows, each of the plurality of conductive elements comprising a contact portion, a tail portion opposite the contact portion, and an intermediate portion extending between the contact portion and the tail portion, the plurality of conductive elements comprising pairs of signal conductors and ground conductors disposed between the pairs of the signal conductors; and a member disposed between the first and second rows of conductive elements, the member comprising:

a lossy body having a plurality of openings extending therethrough, a plurality of first protrusions extending from a first side of the member, a plurality of second protrusions extending from a second side of the member opposite the first side, and a conductive layer plated on the lossy body, and the conductive layer comprising a plurality of first portions on the plurality of first protrusions and coupled to ground conductors in the first row, and a plurality of second portions on the plurality of second protrusions and coupled to ground conductors in the second row.

8. The electrical connector of claim 7, wherein:

each of the plurality of openings at least partially overlaps with the contact portions of a respective pair of signal conductors.

9. The electrical connector of claim 7, wherein:

the conductive layer comprises nickel and/or gold.

10. The electrical connector of claim 7, wherein:

the lossy body comprises a binder and a filler in the binder.

11. The electrical connector of claim 7, wherein:

the housing comprises a base portion and a tongue portion extending from the base portion;

the tongue portion extends from the base portion in a mating direction;

the base portion is elongated in a longitudinal direction perpendicular to the mating direction; and the member comprises a plurality of protrusions each elongated in the mating direction and contacting a respective ground conductor.

12. The electrical connector of claim 11, wherein:

at least one opening of the plurality of openings is disposed between every adjacent two protrusions of the plurality of protrusions.

13. The electrical connector of claim 12, wherein:

the conductive layer provides a shortened conductive path between adjacent two protrusions of the plurality of protrusions.

14. The electrical connector of claim 11, wherein:

the housing comprises two rows of terminal slots extending from the base portion along two opposite outer surfaces of the tongue portion, respectively, and a chamber disposed between the two rows of terminal slots;

the member is disposed in the chamber; and the conductive layer of the member is at least exposed by terminals slots of the two rows of terminal slots that are configured to receive respective ground conductors.

15. An electrical connector comprising:

a housing;

a plurality of conductive elements held by the housing, each of the plurality of conductive elements comprising a contact portion, a tail portion opposite the contact portion, and an intermediate portion extending between the contact portion and the tail portion; and a member disposed in the housing, the member comprising a lossy body and a conductive layer plated on the lossy body, the lossy body comprising a plate-shaped portion and a plurality of protrusions protruding from the plate-shaped portion and elongated in a mating direction, wherein:

the plurality of conductive elements are arranged in a first group of conductive elements and a second group of conductive elements in a longitudinal direction on opposite sides of the member;

each group of the first group of conductive elements and the second group of conductive elements comprises a plurality of pairs of signal conductors and ground conductors disposed between adjacent pairs of the plurality of pairs of signal conductors;

the plurality of protrusions comprise a plurality of first protrusions extending towards the ground conductors of the first group of conductive elements and a plurality of second protrusions extending towards the ground conductors of the second group of conductive elements;

the conductive layer comprises a plurality of first portions located on the plurality of first protrusions and a plurality of second portions located on the plurality of second protrusions; and each of the plurality of first portions contacts a respective ground conductor of the ground conductors of the first group of conductive elements, and each of the plurality of second portions contacts a respective ground conductor of the ground conductors of the second group of conductive elements.

16. The electrical connector of claim 15, wherein:

the housing comprising a base portion and a tongue portion extending from the base portion; and the base portion is elongated in the longitudinal direction.

17. The electrical connector of claim 1, wherein:

the conductive layer comprises a plurality of first portions located on the plurality of first protrusions and a plurality of second portions located on the plurality of second protrusions; and each of the plurality of first portions contacts a respective ground conductor of the ground conductors of the first group of conductive elements, and each of the plurality of second portions contacts a respective ground conductor of the ground conductors of the second group of conductive elements.

18. The electrical connector of claim 15, wherein:

the plurality of first protrusions are offset from the plurality of second protrusions in the longitudinal direction.

19. The electrical connector of claim 15, wherein:

the plurality of pairs of signal conductors of the first group of conductive elements are configured according to PCIe; and/or the plurality of pairs of signal conductors of the second group of conductive elements are configured according to SAS/SATA/SATA Express.

20. The electrical connector of claim 15, wherein:

the lossy body of the member comprises at least one opening; and each of the at least one opening extends through the member with at least one of the at least one opening disposed between every two adjacent protrusions of the plurality of protrusions.

* * * * *